United States Patent [19]
Horigome et al.

[11] Patent Number: 5,729,514
[45] Date of Patent: Mar. 17, 1998

[54] CROSS TALK REMOVING DEVICE UTILIZING SIGNAL FROM MAIN TRACK TO SUBTRACT AMPLITUDE ADJUSTED SIGNALS FROM ADJACENT TRACKS

[75] Inventors: Toshihiro Horigome; Seiji Kobayashi, both of Kanagawa, Japan

[73] Assignee: Sony Corporation, Japan

[21] Appl. No.: 764,861

[22] Filed: Dec. 13, 1996

[30] Foreign Application Priority Data

Dec. 26, 1995 [JP] Japan .................................. 7-339674

[51] Int. Cl.⁶ ........................................................ G11B 7/00
[52] U.S. Cl. ...................... 369/58; 369/44.37; 369/44.32; 369/107; 369/124
[58] Field of Search .............................. 369/44.37, 44.41, 369/58, 107, 124, 112, 122, 44.32

[56] References Cited

U.S. PATENT DOCUMENTS

| | | | |
|---|---|---|---|
| 4,980,877 | 12/1990 | Sugiyama et al. | 369/44.41 |
| 5,138,872 | 8/1992 | Maeda | 369/124 |
| 5,144,616 | 9/1992 | Yasukawa et al. | 369/112 |
| 5,181,161 | 1/1993 | Hirose et al. | 369/124 |
| 5,373,437 | 12/1994 | Itoh et al. | 369/44.32 |
| 5,483,515 | 1/1996 | Cheng et al. | 369/124 |

FOREIGN PATENT DOCUMENTS

| | | |
|---|---|---|
| 03-040225 | 2/1991 | Japan . |
| 05-109083 | 4/1993 | Japan . |
| 05-325196 | 12/1993 | Japan . |
| 07-249230 | 9/1995 | Japan . |
| 07-262582 | 10/1995 | Japan . |

*Primary Examiner*—David C. Nelms
*Assistant Examiner*—Kim-Kwok Chu
*Attorney, Agent, or Firm*—Limbach & Limbach L.L.P.

[57] ABSTRACT

A device for removing a crosstalk component mingled from an adjacent track to a target track from a reproduction signal of the target track is provided for automatically adjusting a coefficient on which the amplitude of the reproduction signal of the adjacent track is adjusted for generating a crosstalk component signal. A crosstalk component signal generating unit 20 operates to generate a crosstalk component signal 20E or 20F by adjusting an amplitude of a signal 21a or 22a having a suppressed high frequency component of each reproduction signal ERF or FRF of the adjacent track with respect to the coefficient KE or KF. A subtracting unit 30 operates to output subtract the crosstalk component signal 20E or 20F from a main reproduction signal MRF for outputing a crosstalk-removed signal 8a. A correlation operating unit 42 or 52 included in the coefficient setting unit 40 or 50 operates to derive a correlation between the crosstalk-removed signal 8a and the signal 21a or 22a having the suppressed high frequency component. A coefficient increasing or decreasing unit 43 or 53 operates to increase the coefficient KE or KF if the correlation is positive or decrease the coefficient KE or KF if the correlation is negative.

6 Claims, 11 Drawing Sheets

CROSS TALK REMOVING DEVICE UTILIZING SIGNAL FROM MAIN TRACK TO SUBTRACT AMPLITUDE ADJUSTED SIGNALS FROM ADJACENT TRACKS

BACKGROUND OF THE INVENTION

The present invention relates to a device for removing crosstalk, which operates to remove signal components of an adjacent track contained in a signal (reproduction signal) read from an optical disk.

The optical disk may has a higher recording density as its track pitch is made narrower. With the track pitch narrower, however, when reproducing data from the optical disk, it is more likely that data recorded on an adjacent track to a target track is mingled (crosstalked) into the reproduction signal and thus is served as a disturbance signal (noise). Hence, when decoding the original data from the reproduction signal, there is more likely to decode the original data erroneously.

To overcome this shortcoming, a technique has been proposed wherein three light beams are applied to three tracks adjacent to one another for reading signals recorded on the adjacent tree tracks and a crosstalk component mingled into the data signal (main reproduction signal) read from the central track (target track) is canceled on the data signals (reproduction signals) read from the two tracks located on both sides of the central track.

For example, a system for reproducing a signal from a optical disk, proposed in the Japanese Laid-open No. Hei3-40225 is arranged so that the reproduction signals read from the three tracks are passed through the corresponding frequency changing filters and then added through the effect of an adder to obtain reproduction output. In this system, with a preamble signal of a track where a desired signal is written, a frequency characteristic of each frequency changing filter is set. The frequency characteristic of each frequency changing filter to which the signal read from each of the adjacent tracks is supplied is set so that these filters for the corresponding tracks located on both sides of the target track may output a replica signal having a reverse characteristic to a crosstalk component of each adjacent track. The frequency changing filter to which the signal read from the central track is supplied has a frequency characteristic set to remove intra-code interference adversely effected by the adjacent bits.

The system for reproducing a signal from an optical disk proposed in the Japanese Laid-open No. Hei5-325196 is intended to offset crosstalk by taking advantage of no correlation between the adjacent tracks on the optical disk and is arranged to derive a coefficient of correlation of sample information of a signal read from the central track with a signal read from the adjacent tracks to the target track and a cancel coefficient for reducing the coefficient of correlation to a minimum.

In the publication of the Japanese Laid-open No. Hei7-249230, the disclosed technique is arranged so that signals read from the adjacent tracks to the target track are supplied to a digital filter for generating a crosstalk component signal and the crosstalk component signal is subtracted from the signal read from the target track.

The conventional technique for canceling crosstalk, however, is required to use a frequency changing filter such as a digital filter for generating a crosstalk component signal. The application of this technique results in making the arrangement of the device for removing crosstalk complicated.

In order to cancel the crosstalk without any frequency changing filter, the system may be arranged so that a crosstalk component signal is generated by adjusting the amplitudes of the signals read from the adjacent tracks through the effect of a variable gain amplifier (attenuator) and then is subtracted from a signal read from a target track for canceling the crosstalk. The amount of crosstalk is greatly influenced by a degree of a radial skew of an optical disk. To effectively cancel the crosstalk, hence, it is possible to sense the radial skew of the optical disk through the effect of a skew sensor and set a gain of the variable gain amplifier (attenuator) according to the sensed radial skew. The provision of the skew sensor, however, results in making the device for reproducing data from the optical disk large in size. Further, it needs an additional circuit for correcting an offset resulting from a mounting error of the skew sensor, which also results in making the overall circuitry complicated.

SUMMARY OF THE INVENTION

The present invention is made to solve the foregoing problems, and it is an object of the present invention to provide a device for removing crosstalk with a simple construction.

According to an aspect of the invention, a device for removing crosstalk includes means for generating a crosstalk component signal by adjusting the amplitudes of reproduction signals read from the adjacent tracks to a target track based on a coefficient, means for subtracting the crosstalk component signal from a reproduction signal of the target track, means for deriving a degree of correlation of a signal from which the crosstalk component signal is removed, the signal supplied from the subtracting means, with the reproduction signals of the adjacent tracks, and means for increasing or decreasing a coefficient for generating the crosstalk component signal based on the degree of correlation derived by the means for deriving the degree of correlation.

According to another aspect of the invention, a device for removing crosstalk arranged to subtract a crosstalk component signal derived by adjusting the amplitudes of reproduction signals read from the adjacent track to a target one based on a coefficient K and to output a signal from which the crosstalk component is removed, includes: residual crosstalk component operating means for deriving a residual crosstalk component of a signal from which the crosstalk component is removed with respect to a coefficient K by subtracting a crosstalk component signal generated on the coefficient K from a reproduction signal read from a target track, means for deriving a residual crosstalk component of a signal from which the crosstalk component is removed with respect to a coefficient K+δ by subtracting the crosstalk component signal generated on the coefficient K+δ, which is larger than the coefficient K by a predetermined amount δ, from the reproduction signal read from the target track; means for deriving a residual crosstalk component of a signal from which the crosstalk component is removed with respect to a coefficient K−δ by subtracting the crosstalk component signal generated on the coefficient K−δ, which is smaller than the coefficient K by a predetermined amount δ, from the reproduction signal read from the target track; and coefficient setting means for updating a coefficient at which the residual crosstalk component is reduced to a minimum to a new coefficient K on the basis of the output of each means for deriving the residual crosstalk component.

According to an aspect of the invention, a device for removing crosstalk is operated on the method taking the steps of: operating a degree of correlation of the signal from which the crosstalk component is removed with the reproduction signals of the adjacent tracks through the effect of the means for deriving a degree of correlation; if the correlation is positive, determining the signal from which the crosstalk component is removed contains a reproduction signal component of the adjacent tracks and increasing the coefficient on which the crosstalk component signals read from the adjacent tracks are generated; if the correlation is negative, determining the signal from which the crosstalk component is removed contain the reproduction signal components of the adjacent tracks in opposite polarity and decreasing a coefficient on which the crosstalk component signals read from the adjacent tracks are generated. By repeating the coefficient adjustment on the degree of correlation, it is possible to automatically push the coefficient on which the crosstalk component signals read from the adjacent tracks are generated into a suitable value, thereby making it possible to effectively remove the crosstalk component.

According to another aspect of the invention, a device for removing crosstalk is operated to compare a residual crosstalk component given if a coefficient for generating the crosstalk component signals read from the adjacent tracks to the target track is increased by a predetermined amount, with that given if the coefficient is decreased by the predetermined amount, and repetitively set the coefficient at which the residual crosstalk is reduced to a new coefficient. This operation makes it possible to automatically push the coefficient for generating the crosstalk component signals read from the adjacent tracks to the target track to a suitable value, thereby effectively removing the crosstalk component from the reproduction signal read from the target track.

DESCRIPTION OF THE PREFERRED EMBODIMENTS

Figure 1:
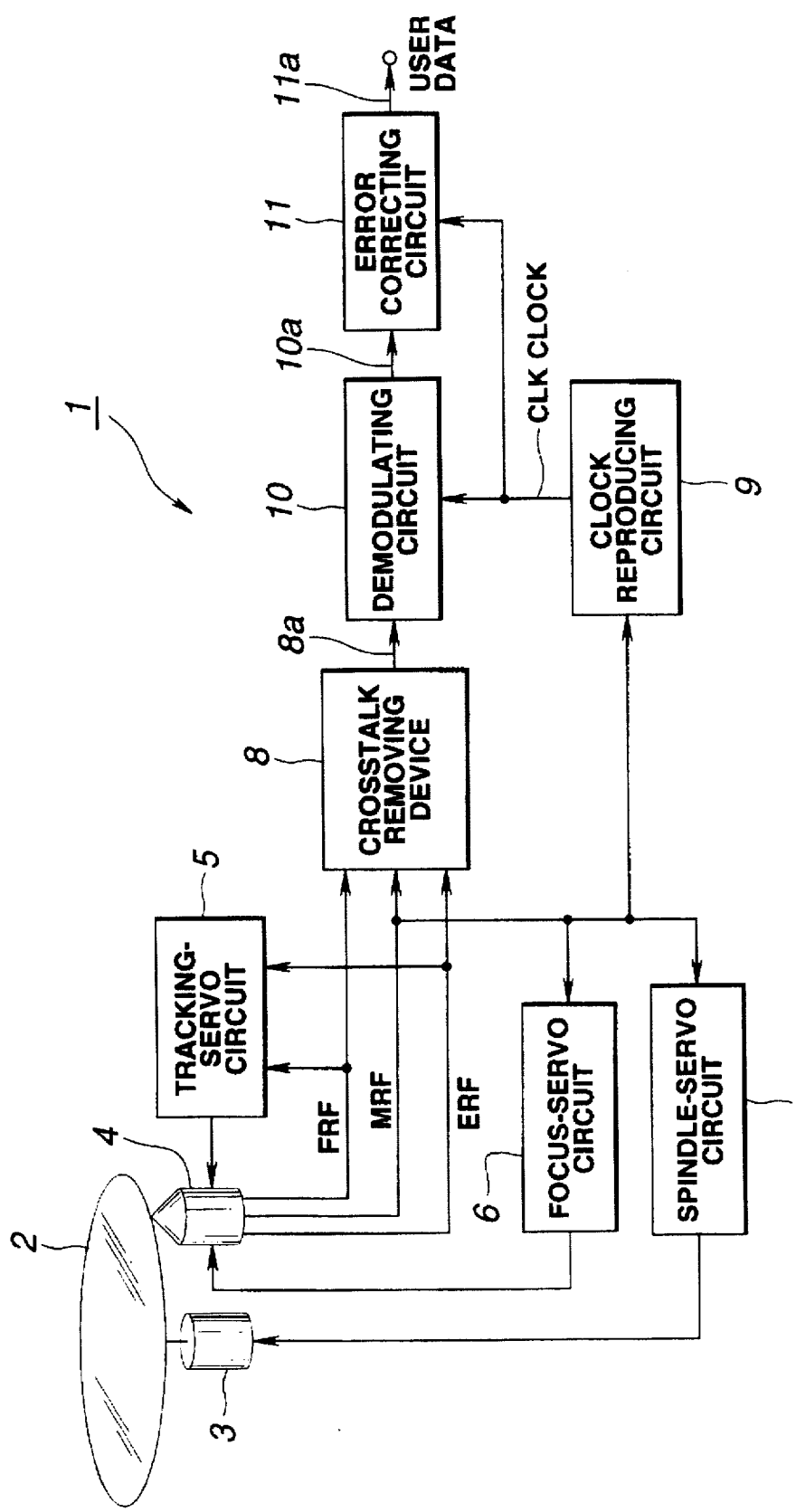
FIG. 1 is a block diagram showing an optical disk reproducing apparatus provided with a crosstalk removing device according to the present invention.

Later, an embodiment of the present invention will be described with reference to the appended drawings. FIG. 1 shows a block diagram showing an apparatus for reproducing data from an optical disk provided with a device for removing crosstalk according to an embodiment of the present invention. In FIG. 1, a reproducing apparatus 1 includes: a spindle motor 3 for rotating an optical disk 2; an optical pick-up unit 4 for applying three laser beams, a main beam for reading a signal and two sub-beams, to the optical disk 2, individually sensing the beams reflected on the optical disk 2 and outputting three reproduction signals MRF, ERF and FRF; a tracking servo circuit 5 for controlling tracking based on the reproduction signals ERF and FRF of the adjacent tracks read by the two sub-beams; a focus-servo circuit 6 for controlling a focus based on the reproduction signal MRF (main reproduction signal) read from the target track by the main beam; and a spindle-servo circuit 7 for controlling a rotation speed of the spindle motor 3 based on the main reproduction signal MRF.

Further, this optical disk reproducing apparatus 1 includes: a crosstalk removing device 8 for removing signal components of the adjacent tracks contained in the main reproduction signal MRF on the basis of the reproduction signals MRF, ERF and FRF output from the optical pickup unit 4; a clock reproducing circuit 9 for reproducing a clock CLK synchronized with the main reproduction signal MRF on the basis of the main reproduction signal MRF; a decoding circuit 10 for converting the main reproduction signal 8a from which the crosstalk component output from the crosstalk removing device 8 is removed into a binary signal on the timing synchronized with the clock CLK supplied from the clock reproducing circuit 9 and outputting a demodulating signal 10a; and an error correcting circuit 11 for detecting and correcting an error of the demodulating signal 10a on the basis of an error correcting code contained in the demodulating signal 10a and outputting the error-corrected user data 11a.

Figure 2:
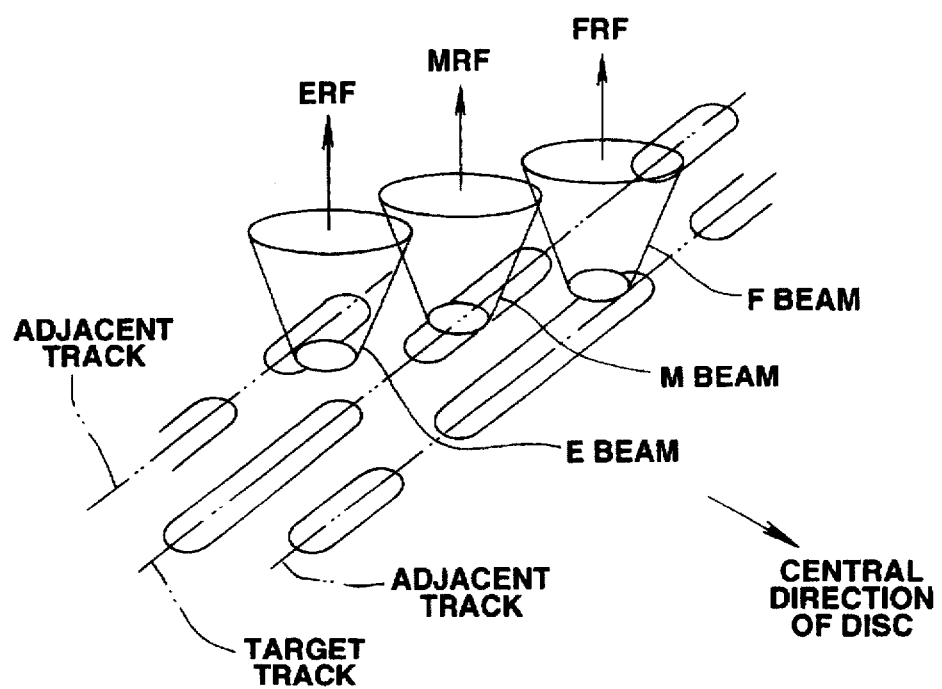
FIG. 2 is an explanatory view showing how the beams of the optical pickup unit are located.
Figure 3:
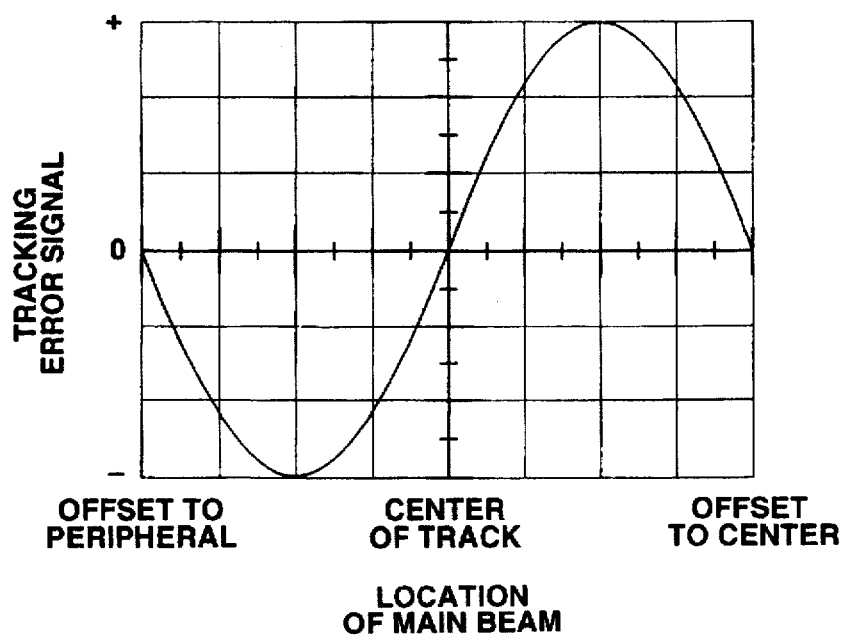
FIG. 3 is a graph showing an output characteristic of a tracking error signal.

FIG. 2 is an explanatory view showing how the beams of the optical pickup unit are located. FIG. 3 is a graph showing an output characteristic of a tracking error signal. The optical pickup unit 4 operates to apply the sub beams to the spots of the adjacent tracks offsets toward the target track, in the range where the sub beams (E and F beams) can substantially reliably read the signals of the corresponding adjacent tracks, in the state that the main beam (M beam) is applied to the center of the target track. The offset amount is a quarter of a track pitch. In the case of removing the crosstalk only, the sub beams (E and F beams) are just applied to the centers of the corresponding adjacent tracks. This reproducing apparatus 1 performs the tracking-servo operation based on a three-beam technique using the sub beams (E and F beams). For this purpose, the applied spot of each sub beam is offset by a predetermined amount from the center of each adjacent track.

In the reproducing apparatus 1, therefore, the tracking-servo circuit 5 shown in FIG. 1 serves to subtract the reproduction signal FRF of one adjacent track from the reproduction signal ERF of the other adjacent track for the purpose of deriving a tracking error signal having an S-character type characteristic. Then, the reproducing apparatus 1 servo-control the location of the optical pickup unit 4 or the location of an optical system such as an objective lens included in the optical pickup unit 4 to make a tracking error signal zero so that the offset between the central position of each adjacent track and the applied spot of the corresponding sub beam is made the same. As a result, the main beam is applied onto the center of the target track. In addition, the sub beams may be adjusted to be applied to the positions offset by the predetermined amount onto both sides of the adjacent tracks.

Figure 4:
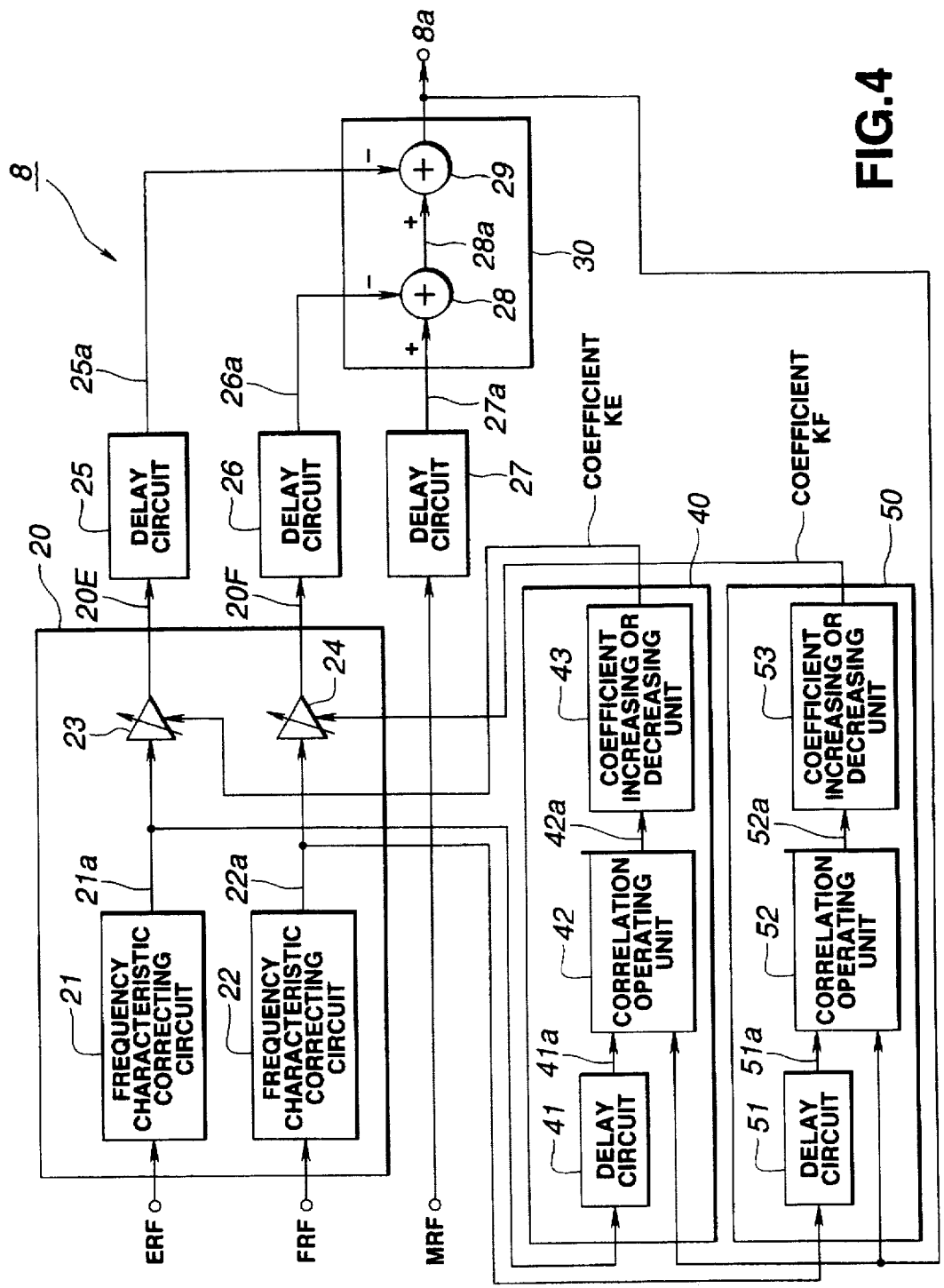
FIG. 4 is a block diagram showing a crosstalk removing device according to the present invention.

FIG. 4 is a circuit diagram showing a crosstalk removing device. This crosstalk removing device 8 includes: a crosstalk component signal generating unit 20 for generating crosstalk component signals 20E and 20F by adjusting the amplitudes of the reproduction signals ERF and FRF of the adjacent tracks on the basis of the corresponding coefficients KE and KF; delaying circuits 25 and 26 for delaying the crosstalk component signals 20E and 20F; a delaying circuit 27 for delaying the main reproduction signal MRF, a subtracting unit 30 for subtracting the crosstalk component signals 20E and 20F from the main reproduction signal MRF; and coefficient setting units 40 and 50 for setting coefficients for generating the crosstalk component signals 20E and 20F from the reproduction signals ERF and FRF of the adjacent tracks.

The crosstalk component signal generating unit 20 provides frequency characteristic correcting circuits (equalizers) 21 and 22 for correcting the frequency characteristics of the reproduction signals ERF and FRF of the adjacent tracks and variable gain amplifiers (attenuators) 23 and 24 for adjusting the amplitudes of the, frequency-corrected reproduction signals 21a and 22a of the adjacent tracks output from the frequency characteristic correcting circuits 21 and 22.

Each frequency characteristic correcting circuit 21 or 22 has a frequency characteristic set by considering the frequency characteristics of the signal components of the adjacent tracks contained in the main reproduction signal MRF read by the main beam.

Figure 5:
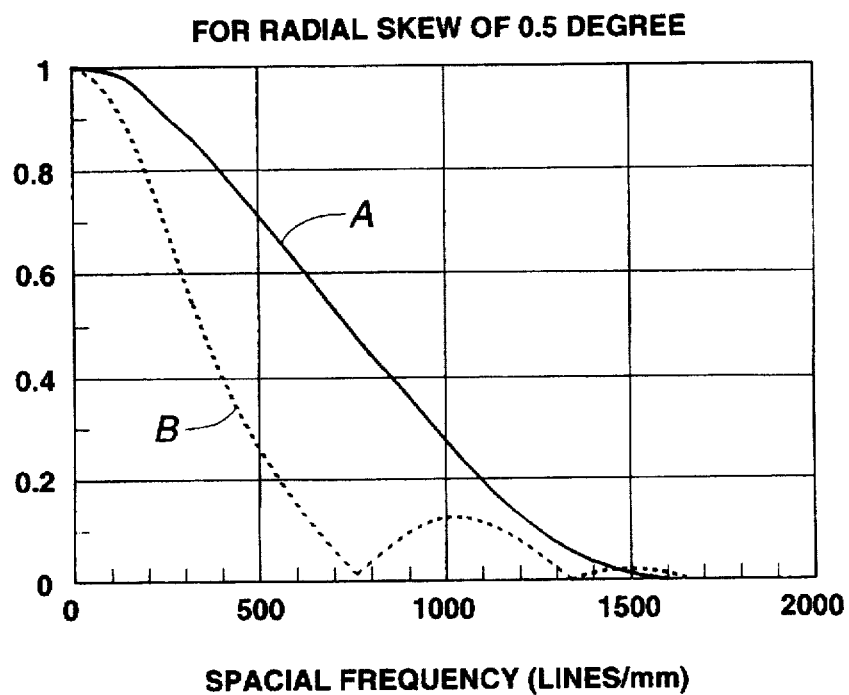
FIG. 5 is a graph showing a computer-simulating result of an MTF (Modulation Transfer Function) of an optical pickup unit when a radial skew is 0.5 degree.
Figure 6:
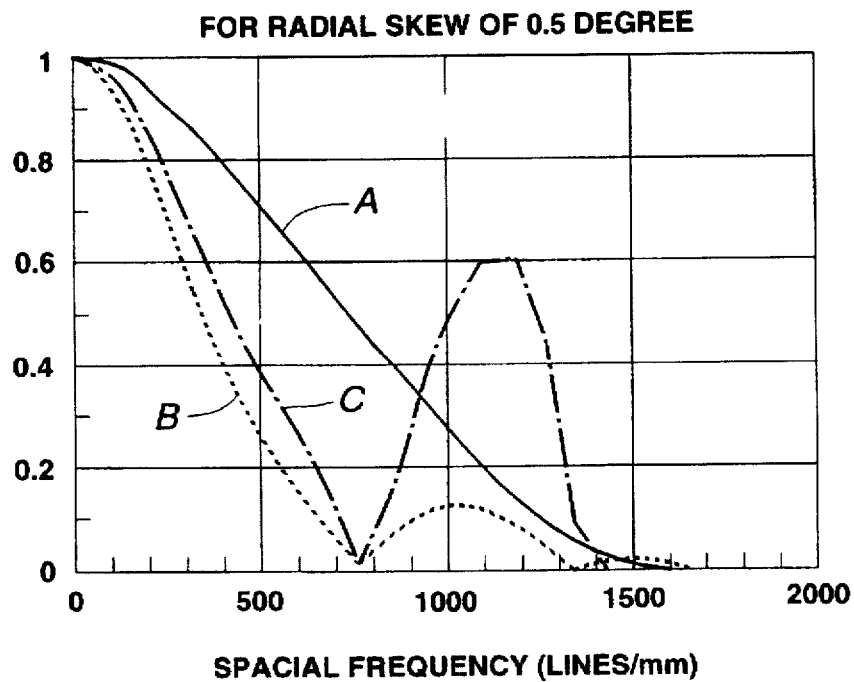
FIG. 6 is a graph showing a frequency characteristic showing a frequency characteristic correcting circuit.

FIG. 5 is a graph showing a computer-simulated result of an MTF (Modulation Transfer Function) of the optical pickup unit when the radial skew is 0.5 degree. FIG. 6 is a graph showing a frequency characteristic of each frequency characteristic correcting circuit. In these graphs, the characteristic curves A and B are normalized so that their gains are 1 when the MTF takes a value of 0.

The characteristic curve A indicated by a real line shows the MTF given when the laser beam spot is offset by a quarter of track pitch from the center of the track on the optical disk. The characteristic curve B indicated by a dotted line indicates the MTF given when the laser beam spot is offset by one track pitch from the center of the track on the optical disk. That is, the characteristic curve A represents the frequency characteristics of the reproduction signals ERF and FRF of the adjacent tracks. The characteristic curve B represents the frequency characteristic of the crosstalk component mingled into the main reproduction signal MRF.

On the basis of the reproduction signals ERF and FRF of the adjacent tracks, therefore, for removing the crosstalk component from the main reproduction signal MRF, the signal corrected by the frequency characteristic is subtracted from the reproduction signals ERF and FRF of the adjacent tracks. The frequency characteristic is set by considering the crosstalk frequency characteristic. This subtraction makes it possible to offer a high effect of removing a crosstalk component.

The frequency characteristics of the frequency characteristic correcting circuits 21 and 22 required for that purpose depict the characteristic curve C indicated in an alternate long and short dash line. In general, the frequency characteristic correcting circuit used for another reproducing apparatus has such a characteristic as placing emphasis on a high frequency component of an input signal, while the frequency characteristic correcting circuits 21 and 22 of the crosstalk component signal generating device 20 have such characteristics as, as a whole, suppressing the high frequency components.

The most approximate frequency characteristics in the frequency characteristic correcting circuits 21 and 22 depend on the largeness of the radial skew. Hence, strictly, it is desirable to optimize the frequency characteristics according to the radial skew. In the range that the radial skew is relatively small, the crosstalk itself is not so large. Hence, it is not necessary to precisely optimize the frequency characteristics of the frequency characteristic correcting circuits 21 and 22. Hence, the frequency characteristics of the frequency characteristic correcting circuits 21 and 22 are optimized in the range that the radial skew is relatively large. If the radial skew is changed, it is possible to use the optimized frequency characteristic in the range that the radial skew is relatively large without changing the frequency characteristic. This results in making the circuitry compact.

As shown in FIG. 4, each variable gain amplifier 23 or 24 is arranged to vary the amplification factor (attenuation factor) on the basis of the coefficients KE and KF supplied from the coefficient setting units 40 and 50.

Each delaying circuit 25, 26 or 27 is used for correcting a time lag among the signals MRF, 20E and 20F when subtracting the crosstalk component signals 20E and 20F from the adjacent tracks from the main reproduction signal MRF. As shown in FIG. 2, the beams applied from the optical pickup unit 4 are not ranged radially with respect to the center of the disk, so that the three reproduction signals MRF, ERF and FRF read by these beams are lagged from one another in time. The reproduction signals ERF and FRF of the adjacent tracks are signal-processed by the frequency characteristic correcting circuits 21 and 22 and the variable gain amplifiers 23 and 24. Hence, these circuits 21 to 24 bring about the corresponding delays. The crosstalk removing device 9 is arranged to correct these time lag through the effect of the delaying circuits 25 to 27. In addition, without providing a delaying circuit for the signal system having the longest delaying time, a delaying circuit may be provided in another signal system.

The subtracting unit 30 is arranged to have two adders 28 and 29 longitudinally connected to each other. The adder 28 at the first stage receives the delaying signal 27a of the main reproduction signal MRF at its +input terminal and a crosstalk component signal 26a of one adjacent track, the time lag of which signal 26a is adjusted by the delaying circuit 26 at its −input terminal. This adder 28 operates to subtract the delaying signal 26a of the crosstalk component signal 20F of one adjacent track from the delaying signal 27a of the main reproduction signal MRF. Then, the adder 28 operates to apply its output 28a to a+input terminal of the adder 29 at the second stage. The adder receives at its −input terminal a crosstalk component signal 25a of one adjacent track, the time slip of which signal 25a is adjusted by the delaying circuit 25. This adder 29 operates to subtract the delaying signal 25a of the crosstalk component signal 20E of one adjacent track from the delaying signal 27a of the main reproduction signal MRF and output the signal from which the crosstalk component is removed (main reproduction signal from which the crosstalk signal component is removed) 8a. In addition, the subtraction of the crosstalk component signal 20E may be replaced with that of 20F in sequence.

Each coefficient setting unit 40 to 50 provides a delaying circuit 41 or 51, a correlation operating unit 42 or 52 and a coefficient increasing or decreasing unit 43 or 53. The coefficient setting unit 40 operates to set a coefficient KE for generating the crosstalk component signal 20E by adjusting the amplitude of the frequency characteristic correcting signal 21a on the basis of the frequency characteristic correcting signal 21a of the reproduction signal ERF of one adjacent track and the signal 8a from which the crosstalk component is removed. The other coefficient setting unit 50 operates to set a coefficient KF for generating the crosstalk component signal 20F by adjusting the amplitude of the frequency characteristic correcting signal 22a on the basis of the frequency characteristic correcting signal 22a of the reproduction signal FRF of the other adjacent track and the signal 8a from which the crosstalk component is removed.

The delaying circuits 41 and 51 operate to delay the output signals 21a and 22a of the frequency characteristic correcting circuits 21 and 22 so as to match the two signals supplied to the correlation operating units 42 and 52 to each other in time.

The correlation operating unit 42 or 52 operates to derive a correlation of a reproduction signal 41a or 51a of each adjacent track delayed by the delaying circuit 41 or 51 with the crosstalk-removed signal 8a fed by the subtracting unit 30. If the result contains a positive correlation, the unit 42 or 52 operates to output a positive voltage, while it contains a negative correlation, the unit 42 or 52 operates to output a negative voltage. That is, the correlation operating unit 42 located inside of one coefficient setting unit 40 serves to supply a positive voltage to the coefficient increasing or decreasing unit 43 if the crosstalk-removed signal 8a contains a component of the reproduction signal ERF of one adjacent track, while it is served to supply a negative voltage to the coefficient increasing or decreasing unit 43 if the signal 8a contains a component of the reproduction signal ERF of that adjacent track in opposite polarity.

The correlation operating unit 52 located inside of the other coefficient setting unit 50 serves to supply a positive voltage to the coefficient increasing or decreasing unit 53 if the crosstalk-removed signal 8a contains a component of the reproduction signal FRF of the other adjacent track, while it serves to supply a negative voltage if the signal 8a contains a component of the reproduction signal FRF of that adjacent track in opposite polarity.

The coefficient increasing or decreasing unit 43 or 53 is composed of an up-down counter. The unit 43 or 53 is arranged to output a preset initial count value as an initial coefficient KE or KF and increase the count value by 1 if it receives a positive voltage from the correlation operating unit 42 or 52 or decrease the count value by 1 if it receives a negative voltage from the correlation operating unit 42 or 52. Hence, if the correlation is positive, the coefficient increasing or decreasing unit 43 or 53 serves to increase the coefficient KE or KF for setting an amplification (attenuation) factor of the variable gain amplifier 23 or 24 by an amplification factor preset according to one count, while if the correlation is negative, the unit 43 or 53 serves to decrease the coefficient KE or KF for setting an amplification (attenuation) factor of the variable gain amplifier 23 or 24 by an amplification factor preset according to one count.

Figure 7:
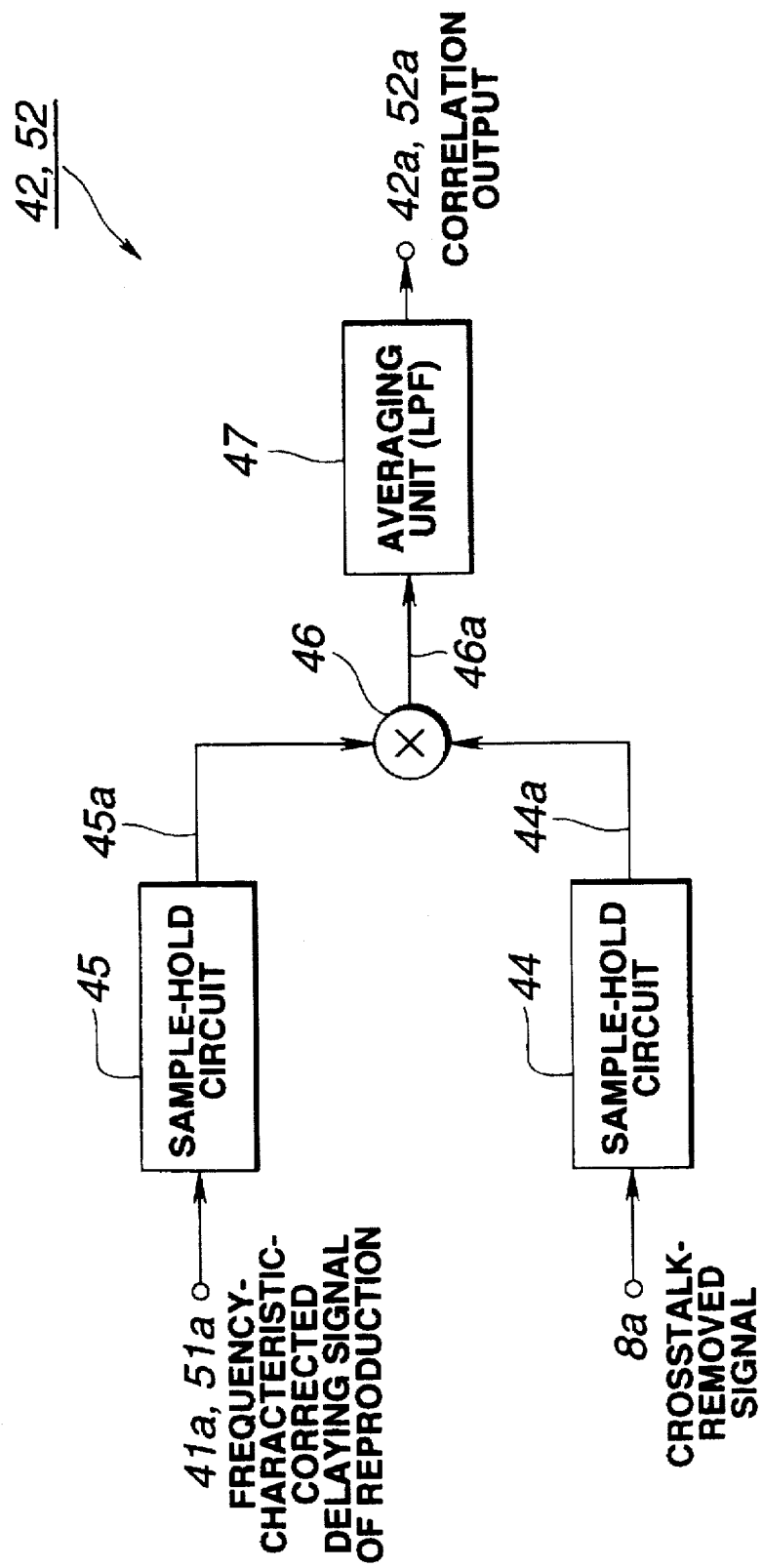
FIG. 7 is a block diagram showing a concrete arrangement of a correlation operating unit.

FIG. 7 is a block diagram showing a concrete arrangement of the correlation operating unit. This correlation operating unit 42 or 52 shown in FIG. 7 is arranged to derive a correlation by using a fixed pattern periodically recorded on an optical disk. The fixed pattern is long enough to make intra-code interference on the central portion of the fixed pattern sufficiently small.

The correlation operating unit 42 or 52 includes: a sample-hold circuit 44 for sampling the central portion of the fixed pattern periodically appearing in the crosstalk-removed signal 8a output from the subtracting unit 30 and holding a sampled signal; a sample-hold circuit 45 for sampling a frequency characteristic correcting signal 41a or 51a of a reproduction signal of one adjacent track corrected in time by the delaying circuit 41 or 51 shown in FIG. 4 and holding the sampled signal; a multiplying circuit 46 for multiplying the sampled signals 44a and 45a fed from the sample-hold circuits 44 and 45 by each other; and an averaging unit 47 composed of a lowpass filter (LPF) for averaging the multiplied output 46a.

The delaying signal 41a or 51a of the frequency characteristic correcting signal 21a or 22a of the reproduction signal of the adjacent track supplied to the sample-hold circuit 45 is matched in time to the crosstalk-removed signal 8a supplied to the sample-hold circuit 44. Hence, the frequency characteristic correcting signal 21a or 22a of the reproduction signal of the adjacent track is sampled on the same timing as the sampling of the central portion of the fixed pattern periodically appearing in the crosstalk removed signal 8a. The signal sampled by the sample-hold circuit 44 or 45 is held until the next sampling timing. The held signal 44a or 45a is supplied to the multiplying circuit 46.

Next, the description will be oriented to the operation of a crosstalk removing device 8 according to the present invention. Consider that sampling is done for only the central portion of the fixed pattern contained in the main reproduction signal MRF of the optical disk 2. At this time, assuming that the intra-code interference is zero in the central portion of the fixed pattern, the signal produced by periodically sampling the central portion of the fixed pattern is made minutely varied by the crosstalk component. It means that if the signal produced by periodically sampling only the portion of the fixed pattern of the crosstalk-removed signal 8a supplied from the subtracting unit 30 does not constantly keep a constant voltage, the signal contains the crosstalk component left therein.

If the positive correlation takes place between the signal produced by that sampling and the reproduction signal ERF or FRF of the adjacent track, it means that the residual crosstalk component contains a component of the reproduction signal ERF or FRF of the adjacent track. If so, it is necessary to increase the amplification factor of the variable gain amplifier 23 or 24 shown in FIG. 4 and increase the signal level of the crosstalk component signal 20E or 20F subtracted by the subtracting unit 30.

Further, if the negative correlation is observed between the signal produced by periodically sampling only the portion of the fixed pattern of the crosstalk-removed signal 8a supplied from the subtracting unit 30 and the reproduction signal ERF or FRF of the adjacent track, it means that the crosstalk-removed signal 8a contains a component of the reproduction signal ERF or FRF of the adjacent track in opposite polarity. If so, since the variable gain amplifier 23 or 24 has a too great amplification factor, it is necessary to lower the amplification factor.

The crosstalk-removed signal 8a is supplied from the subtracting unit 30 to the correlation operating unit 42 or 52. The reproduction signal 21a or 22a of the adjacent track is supplied from the frequency characteristic correcting circuit 21 or 22 to the correlation operating unit 42 or 52 through the delaying circuit 41 or 51. The delaying circuit 41 or 51 serves to match the signals supplied to the correlation operating unit 42 or 52 in time.

The sample-hold circuit 44 included in the correlation operating unit 42 or 52 operates to sample the central portion of the fixed pattern periodically appearing in the crosstalk-removed signal 8a. The sample-hold circuit 44 operates to hold the signal sampled at a time point until the next fixed pattern appears and supply the held sampled signal 44a to the multiplying circuit 46.

The frequency characteristic correcting circuit of the reproduction signal of the adjacent track is adjusted in time by the delaying means 41, 51 to be supplied to the sample-hold circuit 45 and sampled at the same timing as the central portion of the fixed pattern. The sample-hold circuit 45 operates to hold the sampled signal until the next sampling and supplies the held sample signal 45a to multiplying circuit 46.

The multiplying circuit 46 operates to multiply the sampled signals 44a and 45a supplied from the sample-hold circuits 44 and 45 by each other. Then, the multiplying circuit 46 operates to supply the multiplied output 46a to the averaging unit 47 composed of a low-pass filter. The averaging unit 47 operates to suppress a high frequency component of the multiplied output 46a and output the correlation output 42a or 52a (averaged output of the multiplied output 46a) smoothed at the preset time constant. Hence, if any correlation takes place between the two signals input to the correlation operating units 42 and 52, the averaging unit 47 operates to output the correlation signals 42a and 52a of a positive voltage. If the correlation is in opposite polarity, the averaging unit 47 operates to output the correlations 42a and 52a of a negative voltage. If no correlation takes place between the two signals input to the correlation operating units 42 and 52, the correlations 42a and 52a are made zero.

The coefficient increasing or decreasing unit 43 or 53 composed of an up-down counter operates to increment a count value if the correlation output 42a or 52a is positive, decrement a count value if the correlation output 42a or 52a is negative or hold a count value if the correlation output 42a or 52a is zero after the unit 43 or 53 is preset to the count value for the preset initial coefficient KE or KF.

The coefficient setting unit 40 or 50, therefore, outputs the coefficient KE or KF for initial setting and then increment or decrement the coefficient KE or KF according to the crosstalk component left in the signal 8a from which the crosstalk component is removed by the subtracting unit 30. The variable gain amplifier 23 or 24 changes its amplification factor (attenuation factor) based on each coefficient KE or KF, so that the amplitude (signal level) of the crosstalk component signal 20E or 20F is changed according to each coefficient KE or KF.

The coefficient setting unit 40 repeats the increment and decrement of the coefficient KE for adjusting the amplitude of the crosstalk component signal 20E until the correlation between the frequency characteristic correcting signal 21a of the reproduction signal ERF of one adjacent track and the crosstalk-removed signal 8a is made zero. Likewise, the other coefficient setting unit 50 repeats the increment and decrement of the coefficient KF for adjusting the amplitude of the crosstalk component signal 20F until the correlation between the frequency characteristic correcting signal 22a of the reproduction signal FRF of the other adjacent track and the crosstalk-removed signal 8a is made zero. By this operation, the coefficient setting unit 40 or 50 enables to optimize the amplitude of the crosstalk component signal 20E based on the reproduction signal ERF of one adjacent track and the amplitude of the crosstalk component signal 20F based on the reproduction signal FRF of the other adjacent track and then produce a crosstalk-removed signal 8a from which a crosstalk component mingled from both of the adjacent tracks is effectively removed.

Figure 8:
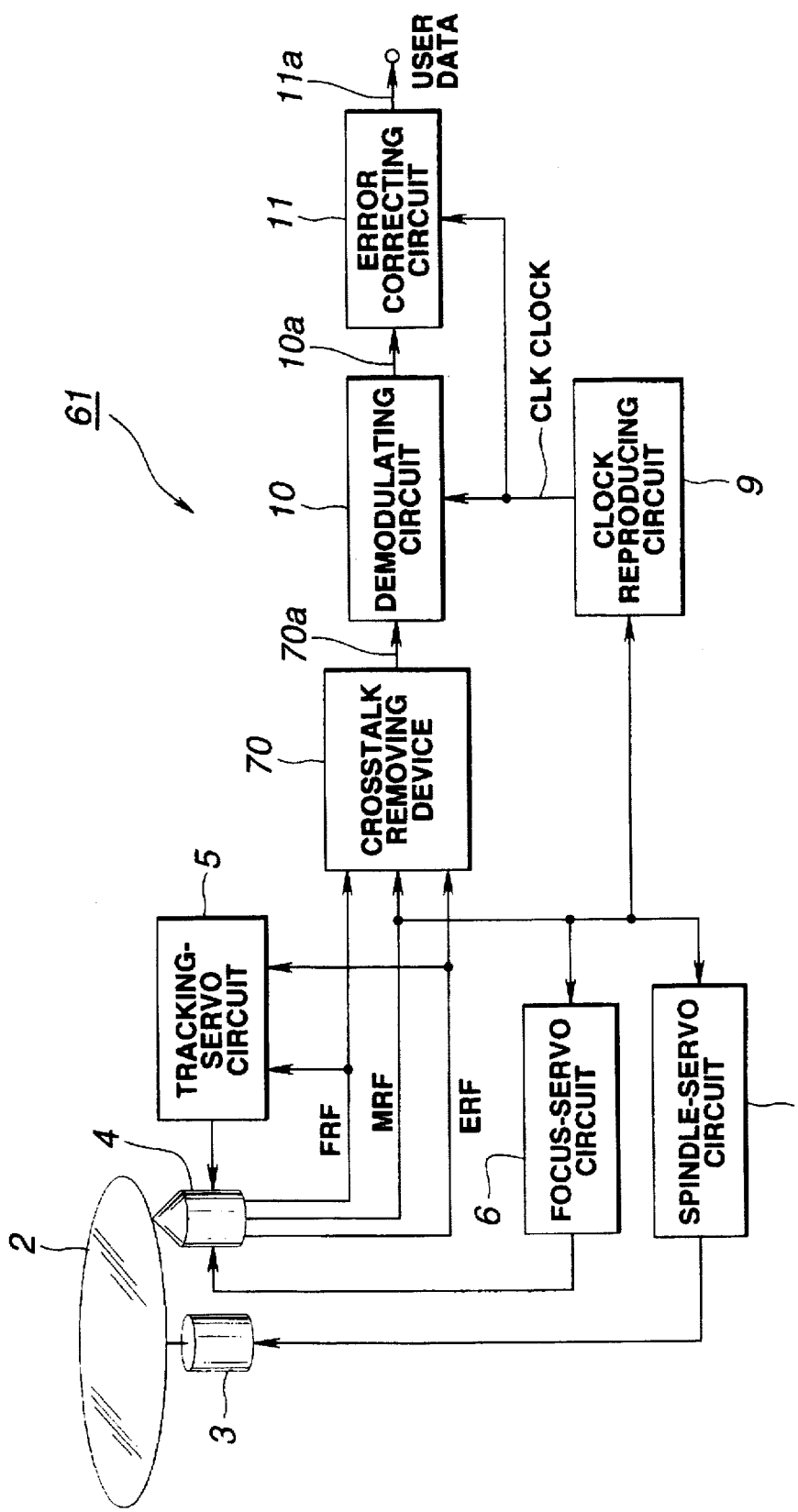
FIG. 8 is a block diagram showing an optical disk reproducing apparatus provided with another crosstalk removing device according to the present invention.

In turn, the description will be oriented to another crosstalk removing device according to the present invention. FIG. 8 is a block diagram showing an optical disk reproducing apparatus provided with another crosstalk removing device 70 according to this invention. The optical disk reproducing apparatus 61 shown in FIG. 8 includes an optical disk 2, a spindle motor 3, an optical pick-up unit 4, a tracking-servo circuit 5, a focus-servo circuit 6, a spindle-servo circuit 7, a crosstalk removing device 70, a clock reproducing circuit 9 a a demodulating circuit 10 and an error correcting circuit 11.

The optical disk 2 contains any fixed pattern periodically pre-recorded thereon. The fixed pattern is long enough to make the intra-code interference in the central portion of the pattern sufficiently small.

The optical pickup unit 4 operates to apply three beams onto the optical disk 2, convert the quantity of the light reflected on the optical disk into an electric signal, amplify the electric signal and output it. The laser beams emitted from the optical pickup unit 4 are located as shown in FIG. 2. This optical pickup unit 4 operates to output the reproduction signals MRF, ERF and FRF of the adjacent three tracks.

The main reproduction signal MRF output from the optical pickup unit 4 is supplied to the focus-servo circuit 6, the spindle-servo circuit 7, and the clock reproducing circuit 9. The focus-servo circuit 6 controls the optical pickup unit as to keep the constant distance between the optical pickup unit 4 and the both sides of the optical disk. The spindle-servo circuit 7 controls the rotation of the spindle motor 3 so as to keep the rotation of the optical disk 2 proper.

The clock reproducing circuit 9 operates to reproduce a clock CLK synchronized with the main reproduction signal MRF based on the signal MRF and supply the reproduced clock CLK to the demodulating circuit 10 and the error correcting circuit 11.

The reproduction signals ERF and FRF of the adjacent tracks output from the optical pickup unit 4 are supplied to the tracking-servo circuit 5. The tracking-servo circuit 5 controls the radial position on the optical disk of the optical pickup unit 4 so as to allow the optical pickup unit 4 to properly trace on the tracks of the optical disk 2.

The reproduction signals MRF, ERF and FRF are supplied from the optical pickup unit 4 to the crosstalk removing device 70. The crosstalk removing device 70 operates to remove the crosstalk components mangled from the adjacent tracks from the main reproduction signal MRF and then supply the resulting crosstalk-removed signal 70a to the demodulating circuit 10.

The demodulating circuit 10 operates to demodulate the crosstalk-removed signal 70a and supply a demodulated signal 10a to the error correcting circuit 11. The error correcting circuit 11 senses and corrects a decoding error on the basis of the error correcting codes. The error-corrected data is output as the user data 11a.

Figure 9:
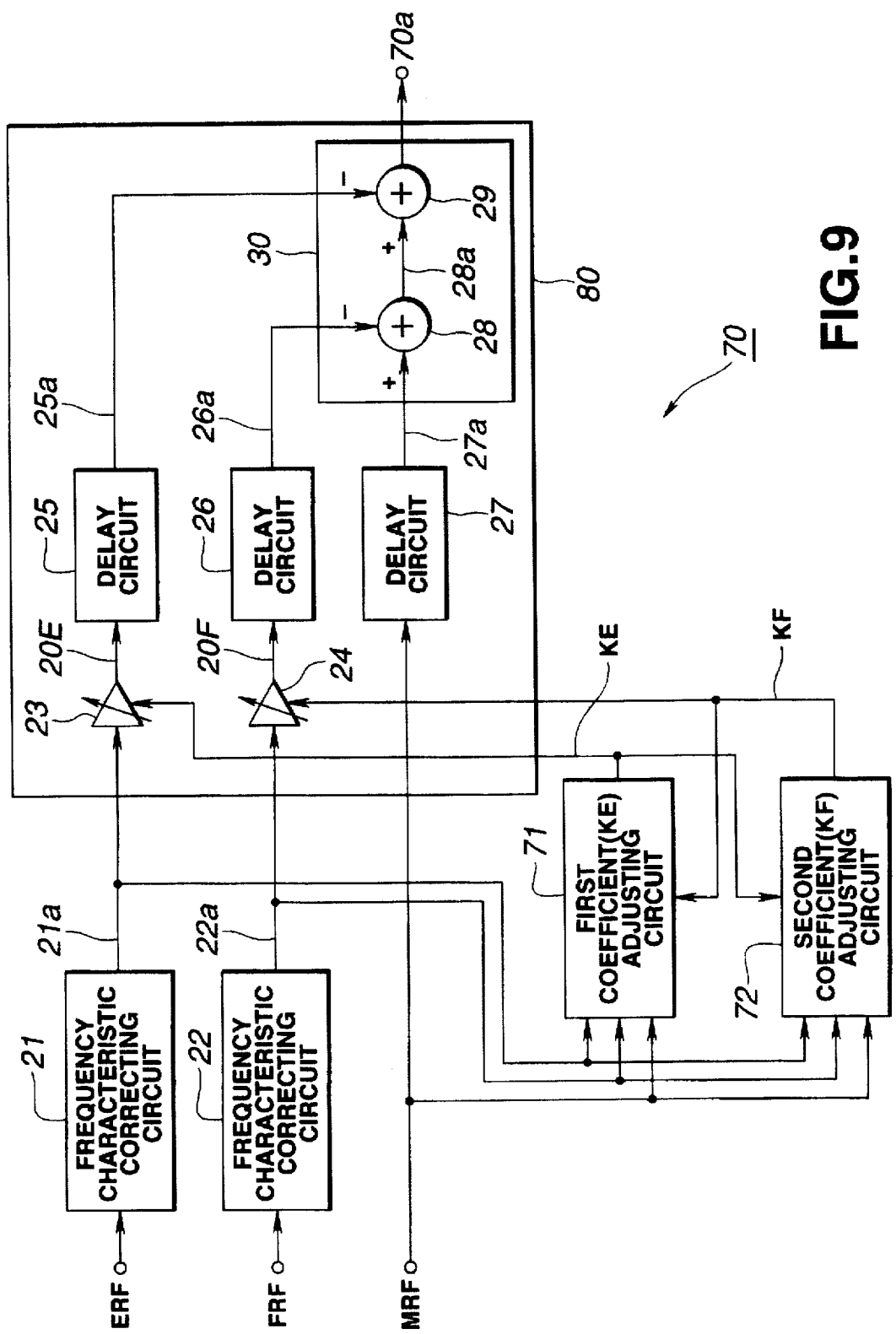
FIG. 9 is a circuit diagram showing another crosstalk removing device according to the present invention.

FIG. 9 is a circuit diagram showing the crosstalk removing device 70. The crosstalk removing device 70 includes the frequency characteristic correcting circuit 21 for correcting a frequency characteristic of the reproduction signal ERF of one adjacent track, a frequency characteristic correcting circuit for correcting a frequency characteristic of the reproduction signal FRF of the other adjacent track, a first coefficient adjusting circuit 71, a second coefficient adjust circuit 72, and a subtracting unit 80. The frequency characteristic correcting circuit 21 or 22 has a frequency correcting characteristic as shown in FIG. 6.

The first coefficient (KE) adjusting circuit 71 operates to adjust the amplitude of the frequency characteristic correcting signal 21a of the reproduction signal ERF of one adjacent track supplied from the frequency characteristic correcting circuit 21 and output the coefficient (KE) for generating the crosstalk component signal 20E mingled from that adjacent track. The second coefficient (KF) adjusting circuit 72 operates to adjust the amplitude of the frequency characteristic correcting signal 22a of the reproduction signal FRF of the other adjacent track supplied from the frequency characteristic correcting circuit 22 and output the coefficient KF for generating the crosstalk component signal 20F mingled from the other adjacent track.

The subtracting unit 80 includes a variable gain amplifier (attenuator) 23 for adjusting the amplitude of the frequency correcting signal 21a of the reproduction signal of one adjacent track supplied from the frequency characteristic correcting circuit 21, a delaying circuit 25 for delaying the crosstalk component signal 20E mingled from that adjacent track, the amplitude of the signal 20E being adjusted by the variable gain amplifier 23, for matching the signal 20E to the main reproduction signal in time, a variable gain amplifier (attenuator) 24 for adjusting the amplitude of the frequency correcting signal 22a of the reproduction signal of the other adjacent track supplied from the frequency characteristic correcting circuit 22, a delaying circuit 26 for delaying the crosstalk component signal 20F mingled from the other adjacent track by adjusting the amplitude of the signal 20F by the variable gain amplifier 24, for matching the signal 20F to the main reproduction signal in time, a delaying circuit 27 for delaying the main reproduction signal MRF for matching it to the other signals in time, and the subtracting unit 30.

The subtracting unit 30 provides an adder 28 located at the first stage and the other adder 29 located at the second stage, both of which are longitudinally connected. The adder 28 located at the first stage operates to subtract the delaying signal 26a of the crosstalk component signal 20F mingled from the other adjacent track output from the delaying circuit 26 from the delaying signal 27a of the main reproduction signal MRF output from the delaying circuit 27. Then, the other adder 29 operates to subtract the delaying signal 25a of the crosstalk component signal 20E mingled from one adjacent track output from the delaying circuit 25 from the result of the adder 29 and then output the crosstalk-removed signal 70a in which the crosstalk component is removed.

Figure 10:
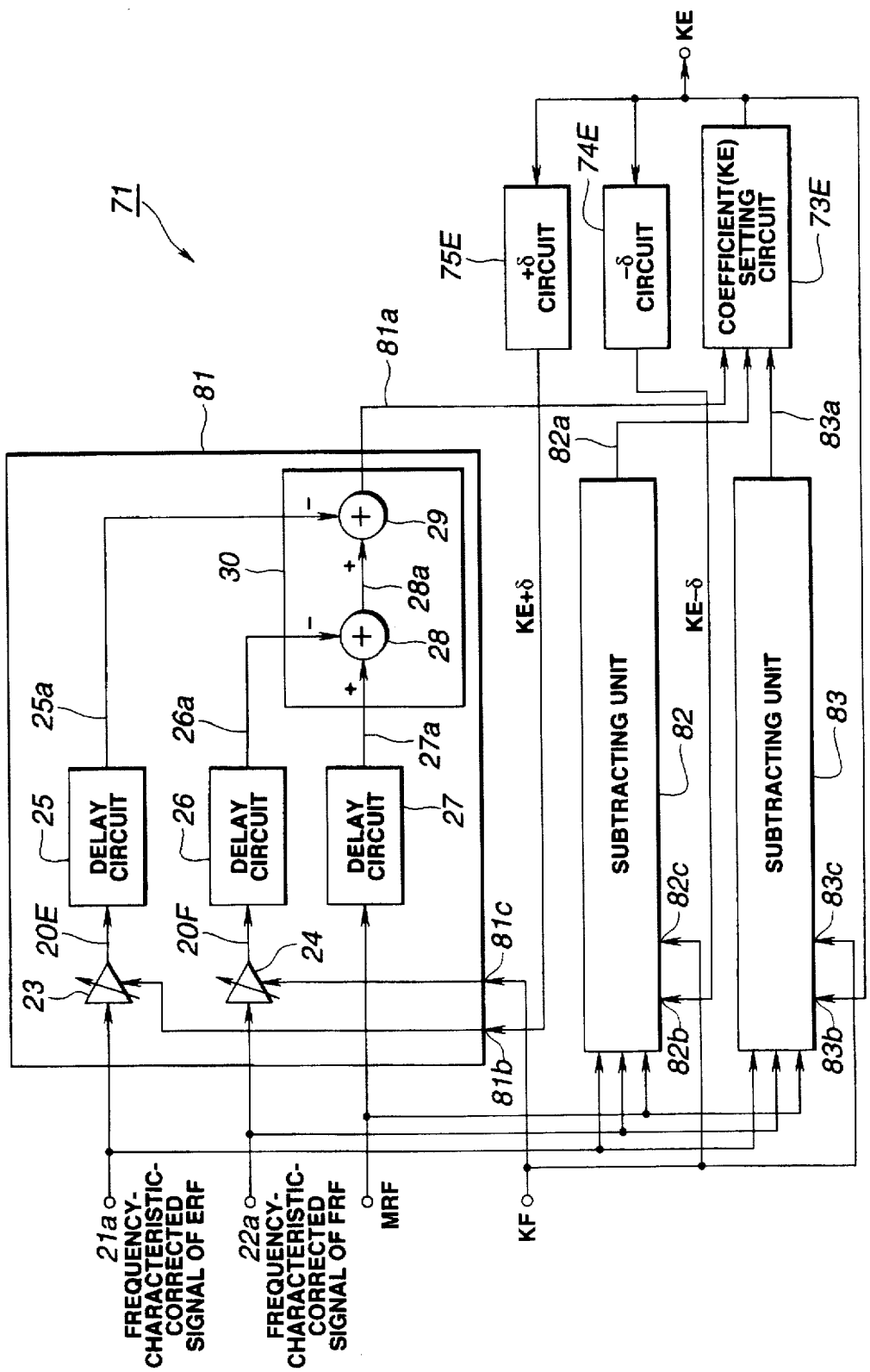
FIG. 10 is a circuit diagram showing a first coefficient (KE) adjusting circuit.

FIG. 10 is a circuit diagram showing the first coefficient adjusting circuit. The first coefficient adjusting circuit 71 includes three system subtracting units 81, 82, 83, a coefficient KE setting circuit 73E for setting the coefficient KE, −δ circuit 74E, and +δ circuit 75E. Each subtracting unit 81, 82 or 83 has the same arrangement as the subtracting unit 80 shown in FIG. 9.

The coefficient KE setting circuit 73E operates to output the preset initial coefficient KE and compare the outputs 81a, 82a and 83a of the subtracting units 81, 82 and 83 with one another on the basis of the initial coefficient KE, determine if the coefficient KE is required to be increased or decreased, and then output a new coefficient KE.

The −δ circuit 74E operates to generate a coefficient KE−δ that is smaller by a given minute amount 8 than the coefficient KE supplied from the coefficient KE setting circuit 73E and then supply the coefficient KE−δ to a first coefficient input terminal 82b of the second subtracting unit 82. The +δ circuit 75E operates to generate a coefficient KE+δ that is greater by a given minute amount 8 than the coefficient KE supplied from the coefficient KE setting circuit 73E and then supply the coefficient KE+δ to a first coefficient input terminal 81b of the first subtracting unit 81. The coefficient KE output from the coefficient KE setting circuit 73E is supplied to a first coefficient input terminal 83b of the third subtracting unit 83. The coefficient KF output from the second coefficient adjusting circuit 72 is supplied to the second coefficient input terminals 81c to 83c of the subtracting units 81 to 83.

Hence, the subtracting unit 81 operates to generate a crosstalk component signal (ERF×(KE+δ)) mingled from one adjacent track, the amplitude of the crosstalk component signal being adjusted with respect to the frequency characteristic correcting signal 21a of the reproduction signal ERF of that adjacent track on the basis of the coefficient KE+δ. At a time, the subtracting unit 81 also operates to generate a crosstalk component signal (FRF×KF) mingled from the other adjacent track, the amplitude of the crosstalk component signal being adjusted with respect to the frequency characteristic correcting signal 22a of the reproduction signal FRF of the other adjacent track on the basis of the coefficient KF, remove the crosstalk component signals (ERF×(KE−δ)) and (FRF×KF) generated from the main reproduction signal MRF, and output the crosstalk-removed signal 81a.

Likewise, the subtracting unit 82 operates to generate a crosstalk component signal (ERF×(KE−δ)) mingled from one adjacent track, the amplitude of the crosstalk component signal being adjusted with respect to the frequency characteristic correcting signal 21a of the reproduction signal ERF of that adjacent track on the basis of the coefficient KE−δ. At a time, the subtracting unit 82 also operates to generate a crosstalk component signal (FRF×KF) mingled from the other track, the amplitude of the crosstalk component signal being adjusted with respect to the frequency characteristic correcting signal 22a of the reproduction signal FRF of the other adjacent track on the basis of the coefficient KF, remove the crosstalk component signals (ERF×(KE−δ)) and (FRF×KF) generated from the main reproduction signal MRF, and output the crosstalk-removed signal 82a.

The subtracting unit 83 operates to generate a crosstalk component signal (ERF×KE) mingled from one adjacent track, the amplitude of the crosstalk component signal being adjusted with respect to the frequency characteristic correcting signal 21a of the reproduction signal ERF of that adjacent track on the basis of the coefficient KE. At a time, the subtracting unit 83 operates to generate a crosstalk component signal (FRF×KF) mingled from one adjacent track, the amplitude of the crosstalk component signal being adjusted with respect to the frequency characteristic correcting signal 22a of the reproduction signal FRF of the other adjacent track, remove the crosstalk component signals (ERF×KE) and (FRE×KF) generated from the main reproduction signal MRF, and output the crosstalk-removed signal 83a.

The signal 83a output from the subtracting unit 83 is the same as the output signal 70a of the subtracting unit 80 shown in FIG. 9. Hence, without providing the subtracting unit 83, it is possible to use the output signal 70a of the subtracting unit 80 shown in FIG. 9.

The coefficient KE setting circuit 73E operates to set a new coefficient KE on the basis of the output signals 81a to 83a of the subtracting units 81 to 83, that is, three crosstalk-removed signals 81a to 83a obtained by dividing the amplitude of the crosstalk component mingled from one adjacent track into three stages.

Figure 11:
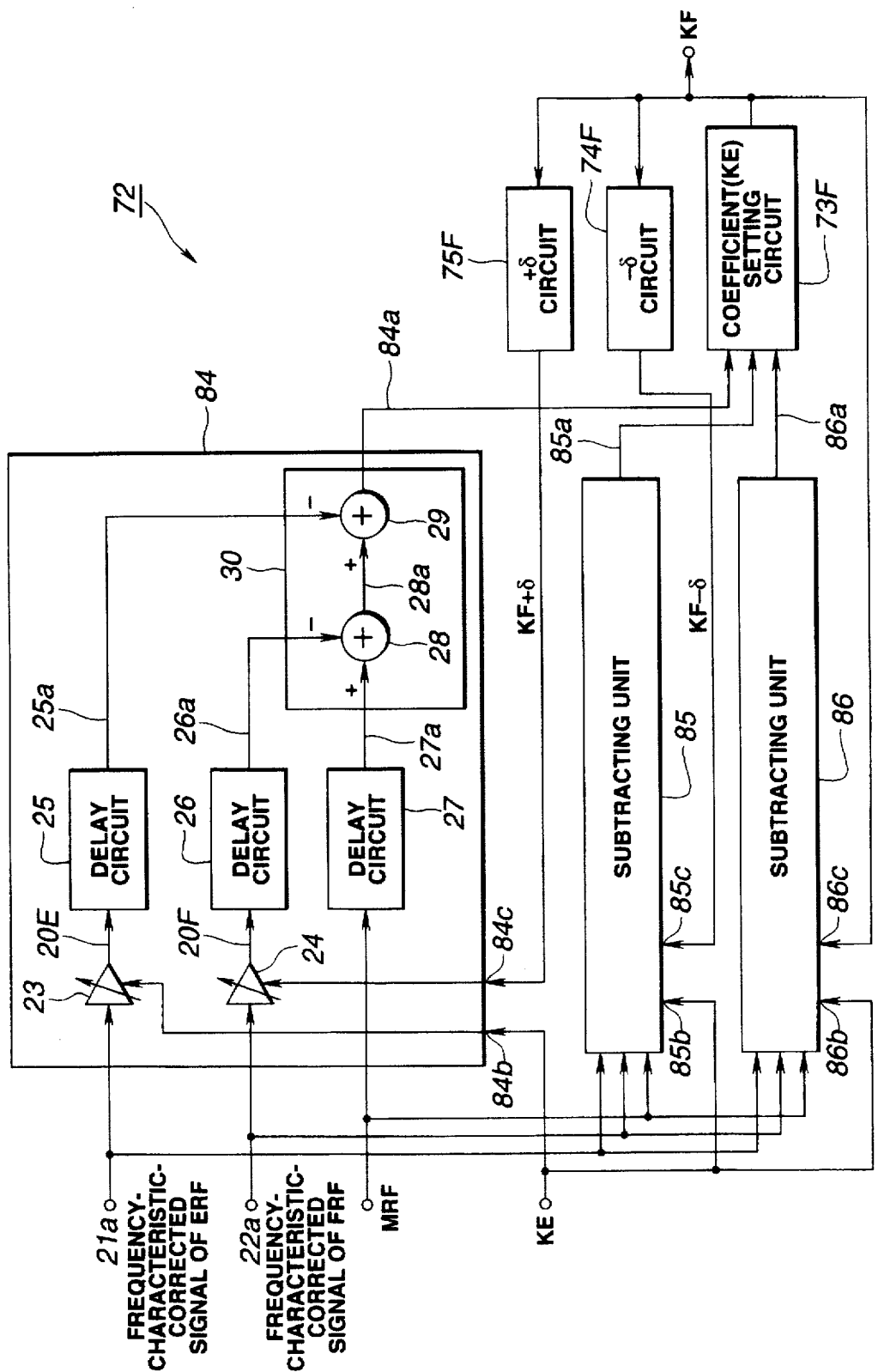
FIG. 11 is a circuit diagram showing a second coefficient (KF) adjusting circuit.

FIG. 11 is a circuit diagram showing the second coefficient adjusting circuit. The second coefficient adjusting circuit 72 includes three systems subtracting units 84, 85, 86, a coefficient KF setting circuit 73F for setting the coefficient KF, a−δ circuit 74F and a+δ circuit 75F. Each subtracting unit 84, 85 or 86 has the same arrangement as the subtracting unit 80 shown in FIG. 9.

The coefficient KF setting circuit 73F operates to output a preset initial coefficient KF and then compare the outputs 84a, 85a and 86a of the subtracting units 84, 85 and 86 on the basis of the initial coefficient KF with one another, determine if the coefficient KF is required to be increased or decreased, and output a new coefficient KF.

The −δ circuit 74F operates to generate a coefficient KF−δ that is smaller by a given minute amount δ than the coefficient KF supplied from the coefficient KF setting circuit 73F and then supply the coefficient KF−δ to a second coefficient input terminal 85c of the second subtracting unit 85. The +δ circuit 75F operates to generate a coefficient KF+δ, that is greater by a given minute amount δ than the coefficient KF supplied from the coefficient KF setting circuit 73F and then supply the coefficient KF+δ to a second coefficient input terminal 84c of the first subtracting unit 84. The coefficient KF output from the coefficient KF setting circuit 73F is directly applied to a second coefficient input terminal 86c of the third subtracting unit 86. The coefficient KE supplied from the first coefficient adjusting circuit 71 is applied to the first coefficient input terminals 84b to 86b of the subtracting units 84 to 86.

Hence, the subtracting unit 84 operates to generate a crosstalk component signal (FRF×(KF+δ)) mingled from the other adjacent track, the amplitude of the crosstalk component signal being adjusted with respect to the frequency characteristic correcting signal 22a of the reproduction signal FRF of that other adjacent track on the basis of the coefficient KF+δ. At a time, the subtracting unit 84 also operates to generate a crosstalk component signal (ERF×KE) mingled from one track, the amplitude of the crosstalk component signal being adjusted with respect to the frequency characteristic correcting signal 21a of the reproduction signal ERF of that adjacent track on the basis of the coefficient KE, remove the crosstalk component signals (FRF×(KF+δ)) and (ERF×KE) generated from the main reproduction signal MRF, and output the crosstalk-removed signal 84a.

Likewise, the subtracting unit 85 operates to generate a crosstalk component signal (FRF×(KF−δ)) mingled from the other adjacent track, the amplitude of the crosstalk component signal being adjusted with respect to the frequency characteristic correcting signal 22a of the reproduction signal FRF of that other adjacent track on the basis of the coefficient KF−δ. At a time, the subtracting unit 85 operates to generate a crosstalk component signal (ERF×KE) mingled from one adjacent track, the amplitude of the crosstalk component signal being adjusted with respect to the frequency characteristic correcting signal 21a of the reproduction signal ERF of one adjacent track on the basis of the coefficient KE, remove the crosstalk component signals (FRF×(KF−δ)) and (ERF×KE) generated from the main reproduction signal MRF, and output the crosstalk-removed signal 85a.

The subtracting unit 86 operates to generate a crosstalk component signal (FRF×KF) mingled from the other adjacent track, the amplitude of the crosstalk component signal being adjusted with respect to the frequency characteristic correcting signal 22a of the reproduction signal FRF of the other adjacent track on the basis of the coefficient KF. At a time, the subtracting unit 86 operates to generate a crosstalk component signal (ERF×KE) mingled from one adjacent track, the amplitude of the crosstalk component signal being adjusted with respect to the frequency characteristic correcting signal 21a of the reproduction signal ERF of that adjacent track on the basis of the coefficient KE, remove the crosstalk component signals (FRF×KF) and (ERF×KE) generated from the main reproduction signal MRF, and output the crosstalk-removed signal 86a.

The signal 88a output from the subtracting unit 86 is the same as the output signal 70a of the subtracting unit 80 shown in FIG. 9 or the output signal 83a of the subtracting unit 83 shown in FIG. 10. Hence, without providing the subtracting unit 86, it is possible to use the output signal 70a of the subtracting unit 80 shown in FIG. 9 or the output signal 83a of the subtracting unit 83 shown in FIG. 10.

The coefficient KF setting circuit 73F operates to set a new coefficient KF on the basis of the output signals 84a to 86a of the subtracting units 84 to 86, that is, the three crosstalk-removed signals 84a to 86a produced by shifting the amplitude of the crosstalk component mingled from the other adjacent track into three stages.

Figure 12:
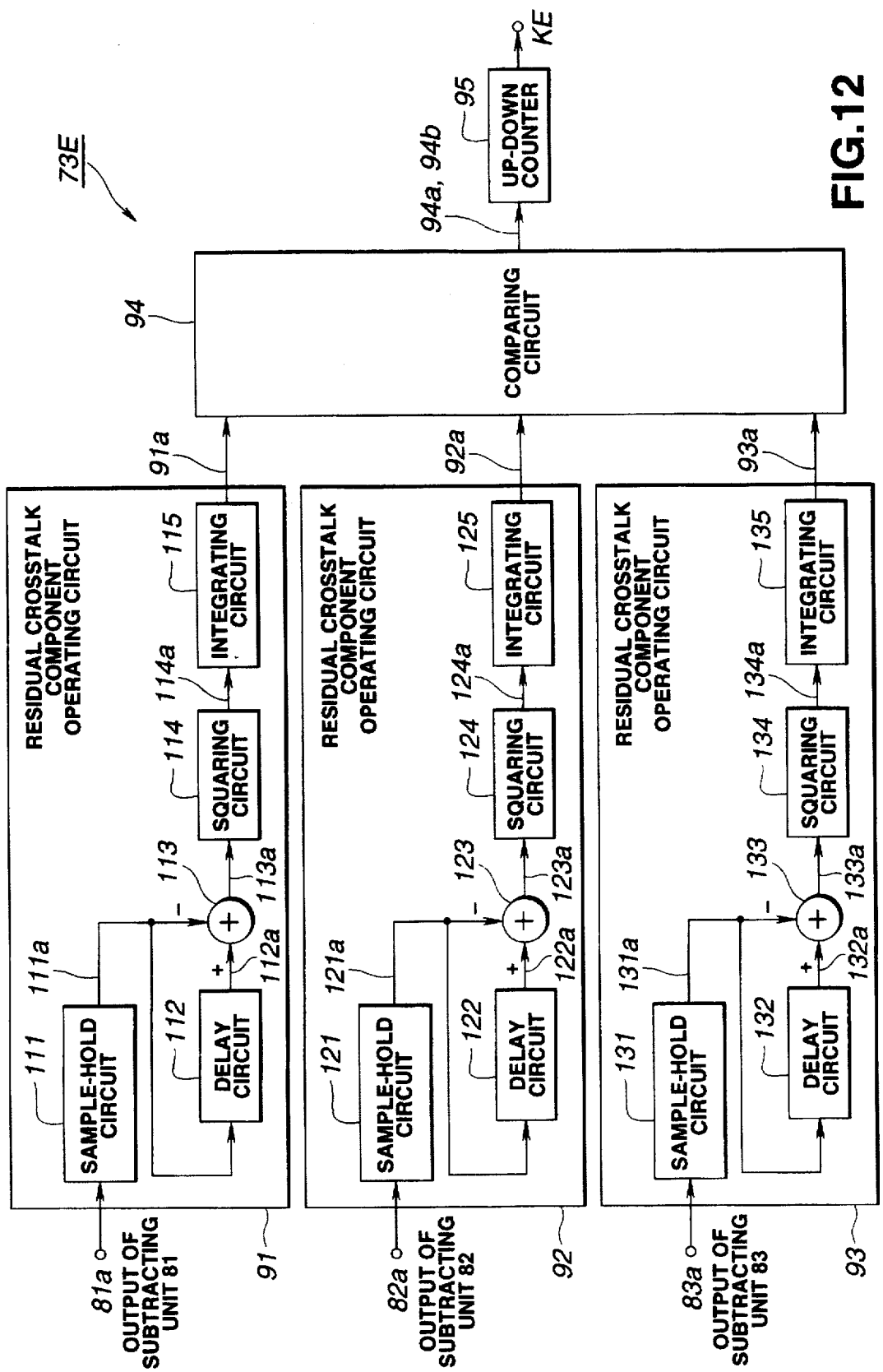
FIG. 12 is a circuit diagram showing a coefficient setting circuit for setting a coefficient KE.

FIG. 12 is a circuit diagram showing the coefficient setting circuit for setting the coefficient KE. The coefficient KE setting circuit 73E includes residual crosstalk component operating circuits 91 to 93 of three systems, a comparing circuit 94 for comparing residual crosstalk component outputs 91a to 93a output from these residual crosstalk component operating circuits 91 to 93, and an up-down counter 95 for incrementing or decrementing the coefficient KE on the basis of the compared outputs 94a and 94b of the comparing circuit 94.

The residual crosstalk component operating circuits 91 to 93 respectively include sample-hold circuits 111, 121, 131 for sampling and holding central portions of fixed patterns contained in the output signals 81a to 82a of the subtracting units 81 to 83 and outputing the held signals, delaying circuits 112, 122, 132 for delaying the outputs 111a, 121a and 121a held by the sample-hold circuits 111, 121, 131 by an appearing period of the fixed pattern, adding circuits 112, 122, 132 for subtracting the outputs 111a, 121a and 131a held by the sample-hold circuits 111, 121 and 131 from the delayed outputs 112a, 122a and 132a of the delaying circuits 112, 122, 132, squaring circuits 114, 124, 134 for taking a square of the outputs 112a, 122a and 133a of the adding circuits 113, 123 and 133, and integrating circuits 115, 125, 135 for integrating the outputs 114a, 124a and 134a of the squaring circuits 114, 124 and 134.

The integrating circuits 115, 125 and 135 are respectively arranged to integrate the outputs 114a, 124a and 134a of the squaring circuits 114, 124 and 134 a given times and then supply the integrated result to the comparing circuit 94 as the residual crosstalk component outputs 91a to 93a.

The comparing circuit 94 operates to compare the residual crosstalk component outputs 91a to 93a of those residual crosstalk component operating circuits 91 to 93. The first residual crosstalk component operating circuit 91 operates to output the residual crosstalk component output 91a if the coefficient is KE+δ. The second residual crosstalk component operating circuit 92 operates to output the residual crosstalk component output 92a if the coefficient is KE−δ. The third residual crosstalk component operating circuit 93 operates to output the residual crosstalk component output 93a if the coefficient is KE. Hence, the comparing circuit 94 operates to select the smallest one of the residual crosstalk component outputs 91a to 93a and outputs a count-up signal 94a if the coefficient of the selected output is KE+δ, a count-down signal 94b if the coefficient of the selected output is KE−δ, and neither of the count-up signal 94a and the count-down signal 94b if the coefficient of the selected output is KE.

The up-down counter 95 is preset to the count value for the preset initial coefficient KE. If the count-up signal 94a is supplied from the comparing circuit 94, the up-down counter 95 is served to increment the count value by 1. If the count-down signal 94b is supplied from the comparing circuit 94, the up-down counter 95 is served to decrement the count value by 1. The count value of the up-down counter 95 is supplied as the coefficient KE to the subtracting unit 80 and the second coefficient adjusting circuit 72 as shown in FIG. 9.

Figure 13:
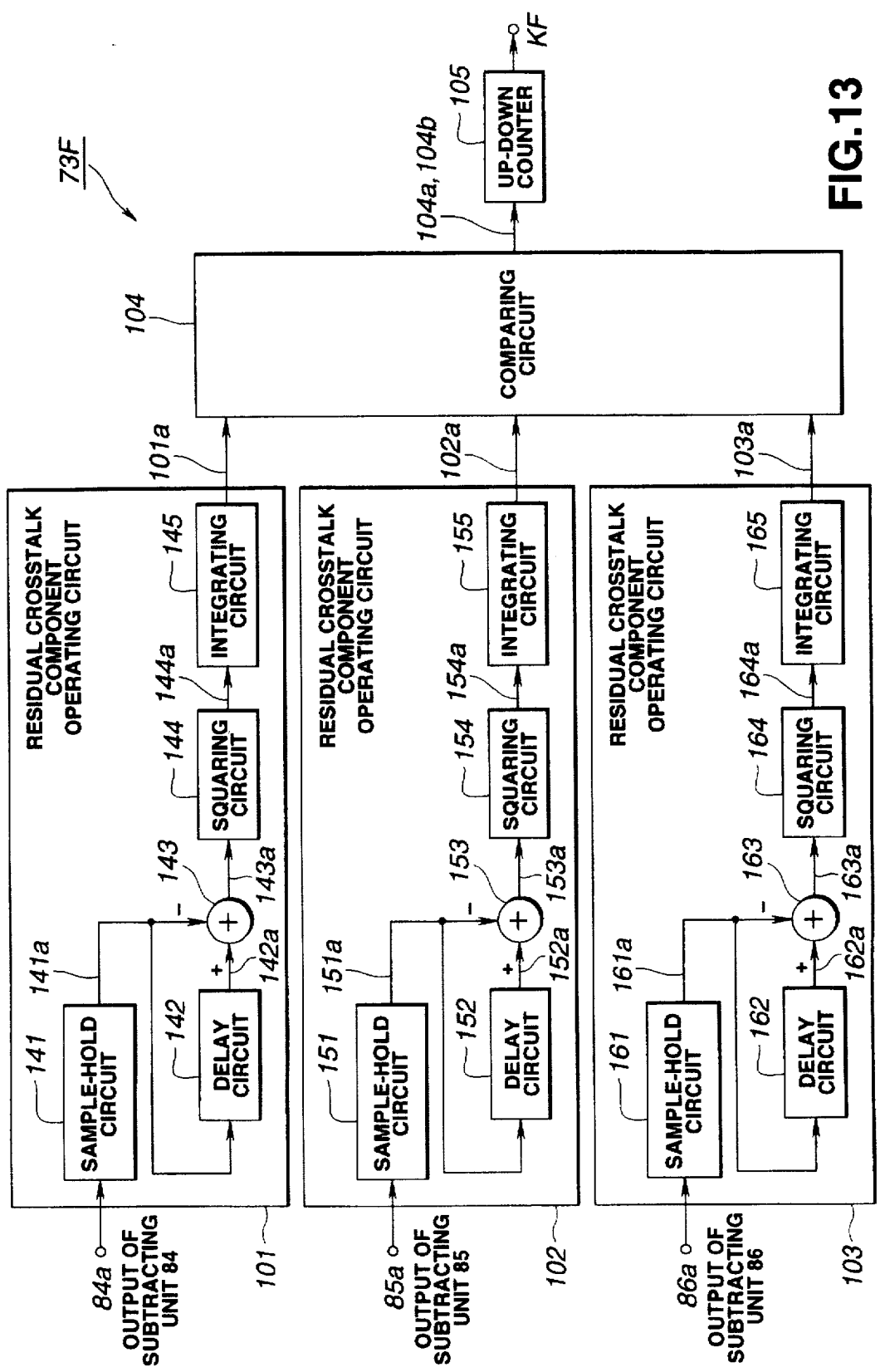
FIG. 13 is a circuit diagram showing a coefficient setting circuit for setting a coefficient KF.

FIG. 13 is a circuit diagram showing a coefficient setting circuit for setting the coefficient KF. The coefficient KF setting circuit 73F includes residual crosstalk component operating circuits 101 to 103 of three systems, a comparing circuit 104 for comparing residual crosstalk component outputs 101a to 103a output from these residual crosstalk component operating circuits 101 to 103, and an up-down counter 105 for incrementing or decrementing the coefficient KF on the basis of the compared outputs 104a and 104b of the comparing circuit 104.

The residual crosstalk component operating circuits 101 to 103 respectively include sample-hold circuits 141, 151 and 161 for sampling and holding central portions of fixed patterns of the output signals 84a to 86a from the subtracting units 84 to 88 and outputting the held signals, delaying circuits 142, 152 and 162 for delaying the outputs 141a, 151a and 181a of the sample-hold circuits 141, 151 and 161 by the appearing periods of the corresponding fixed patterns, adding circuits 143, 153 and 163 for subtracting the outputs 141a, 151a and 161a from the sample-hold circuits 141, 151 and 161 from the delayed outputs 142a, 152a and 162a of the delaying circuits 142, 152 and 162, squaring circuits 144, 154 and 164 for taking squares of the outputs 143a, 153a and 163a of the adding circuits 143, 153 and 163, and integrating circuits 145, 155 and 165 for integrating the outputs 144a, 154a and 164a of the squaring circuits 144, 154 and 164.

The integrating circuits 145, 155, and 165 are arranged to integrate the outputs 144a, 154a and 164a of the squaring circuits 144, 154 and 164 given times and supply the integrated results to the comparing circuit 104 as the residual crosstalk component outputs 101a to 103a.

The comparing circuit 104 operates to compare the residual crosstalk component outputs 101a to 103a sent from the residual crosstalk component operating circuits 101 to 103 of the three systems with one another. Herein, the first residual crosstalk component operating circuit 101 operates to output the residual crosstalk component output 101a if the coefficient is KF+δ. The second residual crosstalk component operating circuit 102 operates to output the residual crosstalk component output 102a if the coefficient is KF−δ. The third residual crosstalk component operating circuit 103 operates to output the residual crosstalk component output 103a if the coefficient is KF. Hence, the comparing circuit 104 operates to compare the residual crosstalk component outputs 101a to 103a with one another and select the smallest one. If the coefficient of the selected one is KF+δ, the comparing circuit 104 operates to output a count-up signal 104a. If the coefficient of the selected one is KF−δ, the comparing circuit 104 operates to output a count-down signal 104b. If the coefficient of the selected one is KF, the comparing circuit 104 operates to output neither of the count-up signal 104a and the count-down signal 104b.

The up-down counter 105 is served to preset a count value as a value corresponding to the preset initial coefficient KF. If the count-up signal 104a is supplied from the comparing circuit 104, the up-down counter 105 operates to increment the count value by 1. If the count-down signal 104b is supplied from the comparing circuit 104, the up-down counter 105 operates to decrement the count value by 1. The count value of the up-down counter 105 is supplied as the coefficient KF to the subtracting unit 80, the first coefficient adjusting circuit 71, both of which are shown in FIG. 9, and the subtracting units 81 to 83 shown in FIG. 10.

In turn, the description will be oriented to the operation of another crosstalk removing device 70 according to the present invention. As shown in FIG. 9, the reproduction signal ERF of one adjacent track output from the optical pickup unit 4 is, at first, supplied to the frequency characteristic correcting circuit 21. This frequency characteristic correcting circuit 21 operates to supply the frequency characteristic correcting signal 21a having an attenuated high frequency component of the reproduction signal ERF of that adjacent track to the variable gain amplifier 23 located in the subtracting unit 80. The variable gain amplifier 23 operates to generate the crosstalk component signal 20E from that adjacent track by adjusting the amplitude of the frequency characteristic correcting signal 21a on the basis of the coefficient KE supplied from the first coefficient adjusting circuit 71 and then supply it to the delaying circuit 25.

The reproduction signal FRF of the other adjacent track supplied from the optical pickup unit 4 is supplied to the frequency characteristic correcting circuit 22. This frequency characteristic correcting circuit 22 operates to supply the frequency characteristic correcting signal 22a having the attenuated high frequency component of the reproduction signal FRF of that other adjacent track to the variable gain amplifier 24 located in the subtracting unit 80. The variable gain amplifier 24 operates to generate the crosstalk component signal 20F mingled from that other adjacent track by adjusting the amplitude of the frequency characteristic correcting signal 22a on the basis of the coefficient KF supplied from the second coefficient adjusting circuit 72 and then supply the signal 20F to the delaying circuit 26.

On the other hand, the main reproduction signal MRF of the target track output from the optical pickup unit 4 is supplied to the delaying circuit 27 located in the subtracting unit 80. The delaying circuits 25 to 26 operate to match the main reproduction signal MRF to the crosstalk component signals 20E and 20F in time. Then, the main reproduction signal MRF output from the delaying circuit 27 is applied to a positive input of the adding circuit 28, while the crosstalk component signal 20F mingled from the other adjacent track output from the delaying circuit 26 is applied to an inverted input of the adding circuit 28. The adding circuit 28 operates to subtract the crosstalk component signal 20F mingled from the other adjacent track applied at the inverted input from the main reproduction signal MRF applied to the positive input and then apply the subtracted output 28a to a positive input of the adding circuit 29 located at the later stage. This subtraction done by the adding circuit 28 located at the first stage makes it possible to remove the crosstalk component signal 20F of the other adjacent track mingled into the main reproduction signal MRF. The crosstalk component signal 20E from one adjacent track is applied to the inverted input of the adding circuit 29 located at the later stage. Hence, the subtraction done by the adding circuit 29 located at the later stage makes it possible to remove the crosstalk component signal 20E of one adjacent track mingled into the main reproduction signal MRF.

As shown in FIG. 10, the first coefficient adjusting circuit 71 provides the subtracting units 81 to 83 of three systems. The first subtracting unit 81 operates to generate a crosstalk component signal (ERF×(KE+δ)) from one adjacent track, the amplitude of the crosstalk component signal being adjusted with respect to the frequency characteristic correcting signal 21a of the reproduction signal ERF of that adjacent track on the basis of the coefficient KE+δ and generate a crosstalk component signal (FRF×KF) from the other adjacent track, the amplitude of the crosstalk component signal being adjusted with respect to the frequency characteristic correcting signal 22a of the reproduction signal FRF of the other adjacent track on the basis of the coefficient KF and output a signal 81a from which the crosstalk component signal (ERF×(KE+δ)) or (FRF×KF) generated from the main reproduction signal MRF is removed.

The second subtracting unit 82 operates to generate a crosstalk component signal (ERF×(KE−δ)) from one adjacent track, the amplitude of the crosstalk component signal being adjusted with respect to the frequency characteristic correcting signal 21a of the reproduction signal ERF of one adjacent track on the basis of the coefficient KE−δ and a crosstalk component signal (FRF×KF) from the other track, the amplitude of the crosstalk component signal being adjusted with respect to the frequency characteristic correcting signal 22a of the reproduction signal FRF of the other adjacent track on the basis of the coefficient KF. Then, the second subtracting unit 82 operates to output a signal 82a from which the crosstalk component signal (ERF×(KE−δ) or (FRF×KF) generated from the main reproduction signal MRF is removed.

The third subtracting unit 83 operates to generate a crosstalk component signal (ERF×KE) from one adjacent track, the amplitude of the crosstalk component signal being adjusted with respect to the frequency characteristic correcting signal 21a of the reproduction signal ERF of one adjacent track on the basis of the coefficient KE and a crosstalk component signal (FRF×KF) from the other adjacent track, the amplitude of the crosstalk component signal being adjusted with respect to the frequency characteristic correcting signal 22a of the reproduction signal FRF of the other adjacent track on the basis of the coefficient KF. Then, the third subtracting unit 83 operates to output a signal 83a from which the crosstalk component signal (ERF×KE) or (FRF×KF) generated from the main reproduction signal MRF is removed.

The signals 81a to 83a output from the subtracting units 81 to 83 are supplied to the residual crosstalk component operating circuits 91 to 93 located in the coefficient setting circuit 73 shown in FIG. 12, respectively.

The output signal 81a of the subtracting unit 81 is supplied to the sample-hold circuit 111 located in the residual crosstalk component operating circuit 91. In the output signal 81 of the subtracting unit 81, a portion where a fixed pattern is reproduced appears in a periodic manner. The sample-hold circuit 111 operates to sample the central portion of the fixed pattern each time the fixed pattern appears and then output the sampled signal to the delaying circuit 112. The delaying circuit 112 operates to delay the signal 111a supplied from the sample-hold circuit 111 by the appearing period of the fixed pattern and then apply it to the positive input of the adding circuit 113. Further, the output signal 111a of the sample-hold circuit 111 is directly applied to the inverted input of the adding circuit 113.

The adding circuit 113 operates to subtract the signal 111a applied to the inverted input from the signal 112a delayed by the appearing period of the fixed pattern applied to the positive input of the circuit 113 and supply the subtracted output 113a to the squaring circuit 114.

The subtracted output 113a corresponds to a variation of the reproduction signal appearing when reproducing the fixed pattern periodically recorded on the optical disk 2. The squaring circuit 114 operates to take a square of the subtracted output 113a and supply the squared value 114a to the integrating circuit 115. The integrating circuit 115 operates to sequentially integrate the squared value 114a. After integrating this value given times ($\alpha$ times), the integrated result, that is, the residual crosstalk component output 91a is supplied to the comparing circuit 94.

The integrated output 91a from the integrating circuit 115 has the following features. That is, if only a small amount of crosstalk component is left in the signal output by the subtracting unit 81, the reproduced portion of the fixed pattern on the optical disk 2 constantly keeps the corresponding signal at the substantially same level. Hence, the output signal of the integrating circuit 115, that is, the result of integrating the variation is made small. If a large amount of crosstalk component is left in the signal output from the subtracting unit 81, the reproduced portion of the fixed pattern on the optical disk 2 produces the signals of variable levels according to the samples through the adverse effect of the crosstalk. Hence, the residual crosstalk component output 91a of the integrating circuit 115 is made large.

The output signal 82a of the subtracting unit 82 is supplied to the sample-hold circuit 121 located in the residual crosstalk component operating circuit 92. In the output signal 82a, the reproduced portion of the fixed pattern appears in a periodic manner. The sample-hold circuit 121 operates to sample a central portion of the fixed pattern each time this fixed pattern appears and then supply it to the delaying circuit The delaying circuit 122 operates to delay the signal 121a by the appearing period of the fixed pattern and then apply to a positive input of the adding circuit 123. The output signal 121a of the sample-hold circuit 121 is directly applied to the inverted input of the adding circuit 123. The adding circuit 123 operates to subtract the signal 121a applied to the inverted input from the signal 122a applied to the positive input for the purpose of operating a variation of the reproduction signal appearing when reproducing the fixed pattern periodically recorded on the optical disk 2. The derived result 123a is supplied to the squaring circuit 124. The squaring circuit 124 operates to take a square of the signal 123a and then supply it to the integrating circuit 125. The integrating circuit operates to sequentially integrate the signal 124a. This integration is done a times in synchronous to the other integrating circuits 115 and 135. Then, the residual crosstalk component output 92a is supplied to the comparing circuit 94.

The output signal 83a of the subtracting unit 83 is supplied to the residual crosstalk component operating circuit 93. In this circuit 93, the same signal treatment as described above is executed, so that the residual crosstalk component output 93a is supplied to the comparing circuit 94.

The comparing circuit 94 operates to search the residual crosstalk component operating circuits 91 to 93 for the circuit for offering the smallest value among the three integrated results 91a to 93a supplied from the residual crosstalk component operating circuits 91 to 93. The residual crosstalk component outputs (integrated results) 91a to 93a output from the residual crosstalk component operating circuits 91 to 93 are made to take a small value if only a small amount of crosstalk component is left in the output signals of the subtracting units 81 to 83. Hence, by searching the residual crosstalk component operating circuits 91 to 93 for the circuit for offering the smallest value of the integrated results 91a to 93a, it is possible to find among the subtracting units 81 to 83 the subtracting unit having the largest effect of removing the crosstalk component.

The first residual crosstalk component operating circuit 91 operates to output the residual crosstalk component output 91a for the coefficient of KE+δ. The second residual crosstalk component operating circuit 92 operates to output the residual crosstalk component output 92a for the coefficient of KE–δ. The third residual crosstalk component operating circuit 93 operates to output the residual crosstalk component output 93a for the coefficient of KE. Hence, the comparing circuit 94 operates to compare the residual crosstalk component outputs 91a to 93a with one another for selecting the smallest one. If the coefficient of the selected one is KE+δ, the comparing circuit 94 operates to output a count-up signal 94a. If the coefficient of the selected one is KE–δ, the comparing circuit operates to output a count-down signal 94b. If the coefficient of the selected one is KE, the comparing circuit 94 operates to output neither of the count-up signal 94a and the count-down signal 94b.

The up-down counter 95 operates to output the preset initial coefficient KE for holding the initial coefficient KE. If the count-up signal 94a is supplied from the comparing circuit 94, the up-down counter 95 is served to output a new value that is greater by δ than the coefficient KE as a new coefficient KE. Or, if the count-down signal 94b is supplied from the comparing circuit 94, the up-down counter is served to output a new value that is smaller by δ than the coefficient KE as a new value. The newly updated coefficient KE is held as an output of the up-down counter 95 until the subsequent count-up signal 94a or count-down signal 94 is supplied.

Then, the first coefficient adjusting circuit 71 repeats the foregoing operation on the basis of the newly set coefficient KE. Hence, the circuit 71 enables to automatically set the coefficient KE on which the crosstalk component mingled from one adjacent track is allowed to be effectively removed.

The second coefficient adjusting circuit 72 shown in FIG. 11 or the coefficient setting circuit 73F shown in FIG. 13 performs the same operation as the above-mentioned one with respect to the coefficient KF for generating the crosstalk component signal mingled from the other adjacent track. Hence, the circuit enables to automatically set the coefficient KF on which the crosstalk component mingled from the other adjacent track is allowed to be effectively removed.

As the increment or decrement δ of the coefficient KE or KF is made more minute, the precision of the resulting coefficient KE or KF is made higher. If the increment or decrement δ of the coefficient KE or KF is minute, a long time is needed to reach the optimal coefficient KE or KF. In a case that the comparing circuit 94 or 104 selects the smallest residual of the crosstalk component, if the residual of the crosstalk component exceeds the preset threshold residual, the comparing circuit 94 or 104 keeps the output of the count-up signal 94a or the count-down signal 94b several times so as to set a new coefficient that has a larger variation than the previous coefficient. If the residual of the crosstalk component exceeds the preset threshold residual, the comparing circuit 94 or 104 operates to supply a command for changing the increment or decrement (not shown) to the +δ circuits 75F and 75E and the –δ circuits 74F and 74E as shown in FIG. 11 so as to set a far larger variation Δ than the minute increment or decrement δ.

As mentioned above, a varying width of the newly set coefficient or the comparing width of the coefficient used in the subtracting units of the three systems is set as a larger value according to the operating amount (crosstalk component residual) of the residual crosstalk component operated by the residual crosstalk component operating circuits 91 to 93 and 101 to 103 so that the coefficient KE or KF may be pushed toward a preferable value for a short time.

FIGS. 10 to 13 show the arrangements where the subtracting units 81 to 86 and the residual crosstalk component operating circuits 91 to 93 and 101 to 103 for the subtracting units 81 to 86 are provided so that the parallel operation is made in each system for reducing the processing time. In the arrangements, there is provided a residual crosstalk component operation storing unit for storing the residual crosstalk component given for a predetermined coefficient in correspondence with the coefficient. The subtracting unit of one system and the residual crosstalk component operating circuit of one system derives the residual crosstalk component for a specific coefficient. The derived residual crosstalk component is stored in the residual crosstalk component operation storing unit. This storing operation is repeated several times with respect to the respective coefficients. Then, the residual crosstalk components for various coefficients stored in the residual crosstalk component operation storing unit are compared with one another for the purpose of setting a new coefficient. This makes it possible to simplify the arrangement of the hardware.

What is claimed is:

1. A crosstalk removing device comprising:
   a means for generating a crosstalk component signal by adjusting an amplitude of a reproduction signal of an adjacent track to a target track based on a coefficient;
   a means for subtracting said crosstalk component signal from said reproduction signal of the target track and outputting a crosstalk component removing signal;
   a means for operating a correlation between said crosstalk component removing signal output from said subtracting means and said reproduction signal of said adjacent track; and
   a means for increasing or decreasing said coefficient for generating said crosstalk component signal on the basis of said correlation operated by said correlation operating means.

2. A crosstalk removing device as claimed in claim 1, wherein said means for deriving a correlation includes multiplying means for multiplying said crosstalk component removing signal by the reproduction signal of the adjacent track to a fixed pattern when reproducing said fixed pattern pre-recorded on plural spots on a disk, and averaging means for averaging a multiplying output of said multiplying means.

3. A crosstalk removing device for subtracting a crosstalk component signal generated by adjusting an amplitude of a reproduction signal of an adjacent track to a target track from said reproduction signal of said target track based on a coefficient, for supplying a crosstalk-removed signal from which said crosstalk component is removed, comprising:

residual crosstalk component operation means about a coefficient K for deriving a residual crosstalk component of said crosstalk-removed signal about said coefficient K produced by subtracting said crosstalk component signal generated on said coefficient K from said reproduction signal of said target track;

residual crosstalk component operating means about a coefficient K+$\delta$ for deriving a residual crosstalk component of said crosstalk-removed signal about said coefficient K+$\delta$ produced by subtracting said crosstalk component signal generated on said coefficient K+$\delta$ that is greater by a given amount than said coefficient K from said reproduction signal of said target track;

residual crosstalk component operating means about a coefficient K−$\delta$ for deriving a residual crosstalk component of said crosstalk-removed signal about said coefficient K−$\delta$ produced by subtracting said crosstalk component signal generated on said coefficient K−$\delta$ that is smaller by a given amount than said coefficient K from said reproduction signal of said target track; and coefficient setting means for updating a coefficient on which the residual crosstalk component is made the smallest as a new coefficient K on the basis of the output of each of said residual crosstalk component operating means.

4. A crosstalk removing device as claimed in claim 3, wherein said residual crosstalk component operating means is served to derive said residual crosstalk component by averaging the variation of said crosstalk-removed signal when reproducing a fixed pattern pre-recorded on plural spots of a disk.

5. A crosstalk removing device as claimed in claim 3, wherein if said residual crosstalk component is greater than a preset value, said given amount $\delta$ is greater than a larger value $\Delta$ than said given amount $\delta$.

6. A crosstalk removing device as claimed in claim 3, wherein If the coefficient on which the residual crosstalk component is made the smallest is K+$\delta$ or K−$\delta$ and the residual crosstalk component at that coefficient K+$\delta$ or K−$\delta$ is greater than the preset value, with a newly set coefficient, said given amount $\delta$ is set to K+$\Delta$ or K−$\Delta$ by using a greater value $\Delta$ than said given amount $\delta$.

* * * * *

UNITED STATES PATENT AND TRADEMARK OFFICE
CERTIFICATE OF CORRECTION

PATENT NO. : 5,729,514
DATED : March 17, 1998
INVENTOR(S) : TOSHIHIRO HORIGOME ET AL.

It is certified that error appears in the above-indentified patent and that said Letters Patent is hereby corrected as shown below:

In Col. 21, line 12, please change "amount than" to --amount $\delta$ than--;

In Col. 21, line 15, please change "K-$\delta$for" to --K-$\delta$ for--; and

In Col. 21, line 19, please change "amount than" to --amount $\delta$ than--.

Signed and Sealed this

Twenty-seventh Day of October, 1998

Attest:

BRUCE LEHMAN

*Attesting Officer*     *Commissioner of Patents and Trademarks*